(12) United States Patent
Liu et al.

(10) Patent No.: US 8,873,525 B2
(45) Date of Patent: Oct. 28, 2014

(54) METHOD AND APPARATUS FOR SOUNDING MULTIPLE STATIONS

(75) Inventors: Yong Liu, Campbell, CA (US);
Hongyuan Zhang, Fremont, CA (US);
Raja Banerjea, Sunnyvale, CA (US);
Harish Ramamurthy, Sunnyvale, CA (US); Sudhir Srinivasa, Sunnyvale, CA (US)

(73) Assignee: Marvell World Trade Ltd, St. Michael (BB)

( * ) Notice: Subject to any disclaimer, the term of this patent is extended or adjusted under 35 U.S.C. 154(b) by 927 days.

(21) Appl. No.: 12/959,145

(22) Filed: Dec. 2, 2010

(65) Prior Publication Data
US 2011/0128929 A1 Jun. 2, 2011

Related U.S. Application Data

(60) Provisional application No. 61/266,067, filed on Dec. 2, 2009, provisional application No. 61/303,231, filed on Feb. 10, 2010, provisional application No. 61/319,786, filed on Mar. 31, 2010, provisional application No. 61/322,259, filed on Apr. 8, 2010, provisional application No. 61/357,882, filed on Jun. 23, 2010, provisional application No. 61/368,554, filed on Jul. 28, 2010, provisional application No. 61/370,631, filed on Aug. 4, 2010.

(51) Int. Cl.
*H04W 4/00* (2009.01)
*H04L 25/03* (2006.01)
*H04L 25/02* (2006.01)

(52) U.S. Cl.
CPC . *H04L 25/03343* (2013.01); *H04L 2025/03802* (2013.01); *H04L 25/0204* (2013.01); *H04L 25/0228* (2013.01); *H04L 2025/03426* (2013.01)
USPC .......................................... 370/338

(58) Field of Classification Search
None
See application file for complete search history.

(56) References Cited

U.S. PATENT DOCUMENTS 7,162,476 B1 1/2007 Belair et al.
8,144,647 B2 3/2012 Nabar et al.
(Continued)

FOREIGN PATENT DOCUMENTS

CN 1781274 A 5/2006
JP 2006-524969 A 11/2006
(Continued)

OTHER PUBLICATIONS

IEEE Std 802.11a-1999; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications—High-speed Physical Layer in the 5 GHz Band; 1999; pp. 1-83; Institute of Electrical and Electronics Engineers, Inc.

(Continued)

*Primary Examiner* — John Blanton

(57) ABSTRACT

One or more stations to provide sounding feedback in response to a training signal sequence are determined, and a schedule for the one or more stations to provide sounding feedback is determined based on capabilities of the one or more stations to transmit sounding feedback at a defined time period after an end of the training signal sequence. A communication frame is generated that includes i) an indication of a request for the plurality of stations to provide sounding feedback corresponding to the training signal sequence, and ii) an indication of when the one or more stations are to transmit sounding feedback. The communication frame is transmitted along with the training sequence.

20 Claims, 24 Drawing Sheets

(56) References Cited

U.S. PATENT DOCUMENTS

| | | | |
|---|---|---|---|
| 8,149,811 | B2 | 4/2012 | Nabar et al. |
| 8,270,909 | B2 | 9/2012 | Zhang et al. |
| 8,472,383 | B1 | 6/2013 | Banerjea et al. |
| 8,599,803 | B1 | 12/2013 | Zhang et al. |
| 2005/0289256 | A1 | 12/2005 | Cudak et al. |
| 2007/0115972 | A1* | 5/2007 | Jang et al. ............... 370/389 |
| 2008/0075058 | A1 | 3/2008 | Mundarath et al. |
| 2009/0196163 | A1 | 8/2009 | Du |
| 2009/0201818 | A1 | 8/2009 | Patwardhan et al. |
| 2009/0201861 | A1* | 8/2009 | Kotecha ................ 370/329 |
| 2009/0252145 | A1* | 10/2009 | Meylan et al. .......... 370/348 |
| 2010/0046656 | A1 | 2/2010 | van Nee et al. |
| 2010/0091673 | A1 | 4/2010 | Sawai et al. |
| 2010/0091675 | A1 | 4/2010 | Sawai |
| 2010/0260159 | A1 | 10/2010 | Zhang et al. |
| 2011/0032875 | A1 | 2/2011 | Erceg et al. |
| 2011/0038332 | A1 | 2/2011 | Liu et al. |
| 2011/0054043 | A1 | 3/2011 | Funaki et al. |
| 2011/0096796 | A1 | 4/2011 | Zhang et al. |
| 2011/0096797 | A1 | 4/2011 | Zhang et al. |
| 2011/0103280 | A1 | 5/2011 | Liu et al. |
| 2011/0124289 | A1 | 5/2011 | Balachandran et al. |
| 2011/0128947 | A1 | 6/2011 | Liu et al. |
| 2011/0310827 | A1 | 12/2011 | Srinivasa et al. |

FOREIGN PATENT DOCUMENTS

| | | |
|---|---|---|
| JP | 2008-524898 A | 7/2008 |
| WO | WO-2004/098072 A2 | 11/2004 |
| WO | WO-2006/064418 A1 | 6/2006 |
| WO | WO-2008/077433 A1 | 7/2008 |

OTHER PUBLICATIONS

IEEE Std 802.11b-1999/Cor 1-2001; IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 2: Higher-speed Physical Layer (PHY) extension in the 2.4 GHz band—Corrigendum 1; 2001; pp. 1-15; Institute of Electrical and Electronics Engineers, Inc.
IEEE P802.11g/D8.2; Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; 2003; pp. 1-69; Institute of Electrical and Electronics Engineers, Inc.
Kiran Gunnam, Gwan Choi, Weihuang Wang, Mark Yeary; Multi-Rate Layered Decoder Architecture for Block LDPC Codes of the IEEE 802.11n Wireless Standard; 2007; pp. 1645-1648; Institute of Electrical and Electronics Engineers, Inc.
International Search Report and Written Opinion in corresponding PCT/US2010/058755 mailed May 4, 2011.
IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.,* Nov. 7, 2001.
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.,* Apr. 2003.
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.,* (1999).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.,* Sep. 2007.
"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.,* Oct. 2009.
S. A. Mujtaba, "IEEE P802.11—Wireless LANs, TGn Sync Proposal Technical Specification," *The Institute of Electrical and Electronics Engineers, Inc.,* doc.: IEEE 802.11—04/0889r6, May 2005.
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.,* (Jun. 12, 2007).
International Preliminary Report on Patentability and Written Opinion in corresponding PCT/US2010/058755 mailed Jun. 5, 2012.
Office Action for U.S. Appl. No. 12/959,079, mailed Sep. 27, 2013.
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009),*The Institute of Electrical and Electronics Engineers,* pp. 207-211 (2009).
Imashioya et al., "RTL Design of 1.2 Gbps MIMO WLAN System and Its Business Aspect," IEEE 9th Int'l Symposium on Communications and Information Technology (ISCIT 2009),*The Institute of Electrical and Electronics Engineers,* pp. 296-301 (2009).
Syafei et al., "A Design of Next Generation Gigabit MIMO Wireless LAN System ," IEEE 12th Int'l Conference on Advanced Communication Technology (ICACT 2010),*The Institute of Electrical and Electronics Engineers,* pp. 941-946 (2010).
Syafei et al., "A Gigabit MIMO WLAN System with International Standardization Strategy," IEEE Int'l Symposium on Intelligent Signal Processing and Communication Systems (ISPACS 2009),*The Institute of Electrical and Electronics Engineers,* pp. 228-231 (2009).
Shi et al., "Phase Tracking During VHT-LTF," Doc. No. IEEE 802.11-10/0771r0, *The Institute of Electrical and Electronics Engineers, Inc.,* Jul. 2010.
van Zelst et al., "Pilot Sequence for VHT-DATA," Doc. No. IEEE 802.11-10/0811r1, *The Institute of Electrical and Electronics Engineers, Inc.,* Jul. 2010.
Zhang et al., "11ac Explicit Sounding and Feedback", *The Institute of Electrical and Electronics Engineers,* doc. No. IEEE 802.11-10/1105r0, (Sep. 2010).
Love et al., "An Overview of Limited Feedback in Wireless Communication Systems," IEEE J. on Selected Areas in Communications, vo. 26, No. 8, Oct. 2008.
Zhang et al., U.S. Appl. No. 12/855,521, entitled "Beamsteering in a Spatial Division Multiple Access (SDMA) System," filed Aug. 12, 2010.

(56) References Cited

OTHER PUBLICATIONS

Liu et al., U.S. Appl. No. 12/963,053, entitled "Method and Apparatus for Facilitating Simultaneous Transmission from Multiple Stations," filed Dec. 8, 2010.

First Office Action in Chinese counterpart application; CN Application No. 201080054573.2, dated Jun. 18, 2014.
Notice of Reasons for Rejection in Japanese counterpart application, JP Application No. 2012-542191, dated Jul. 8, 2014.

* cited by examiner

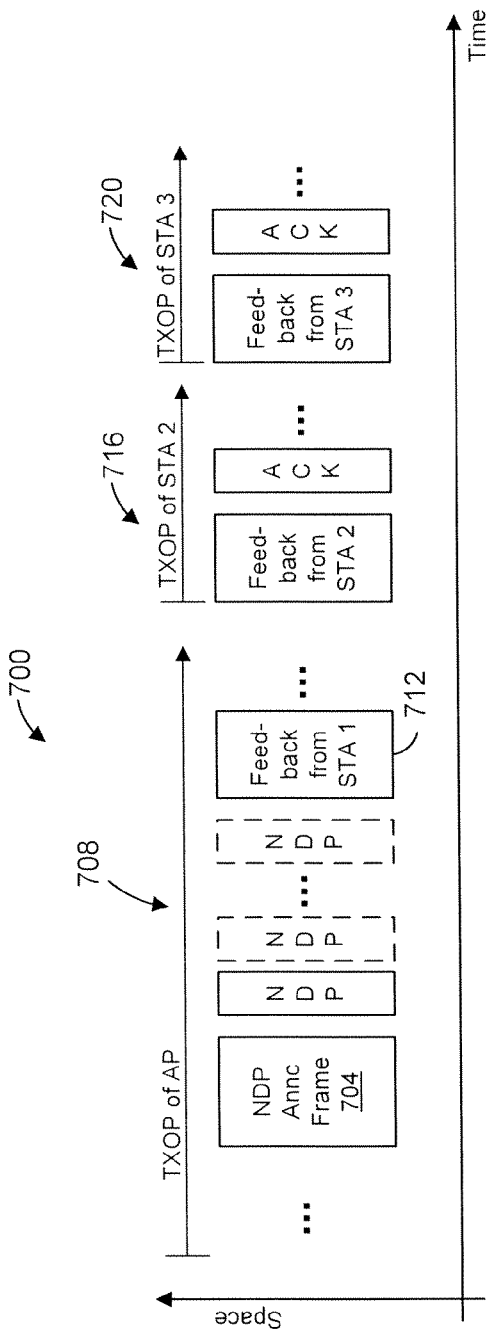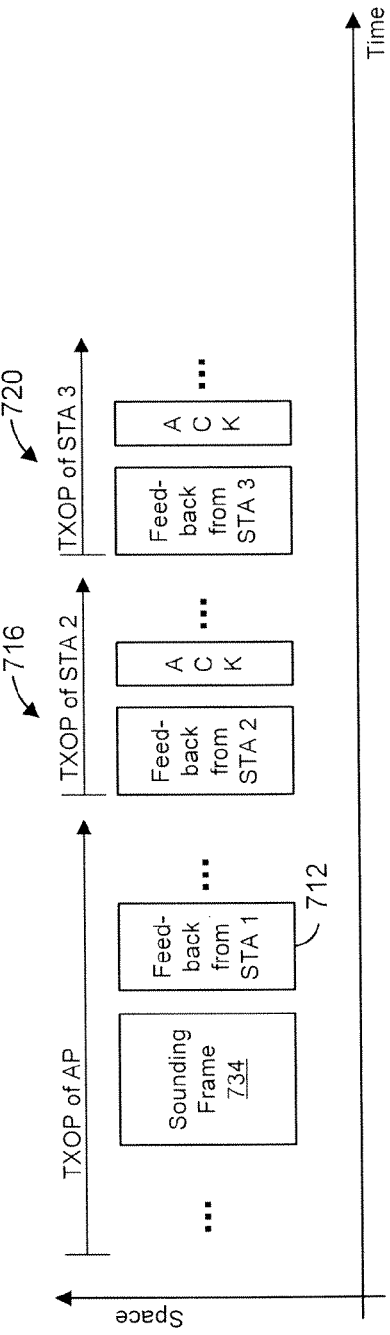
FIG. 11A
FIG. 11B

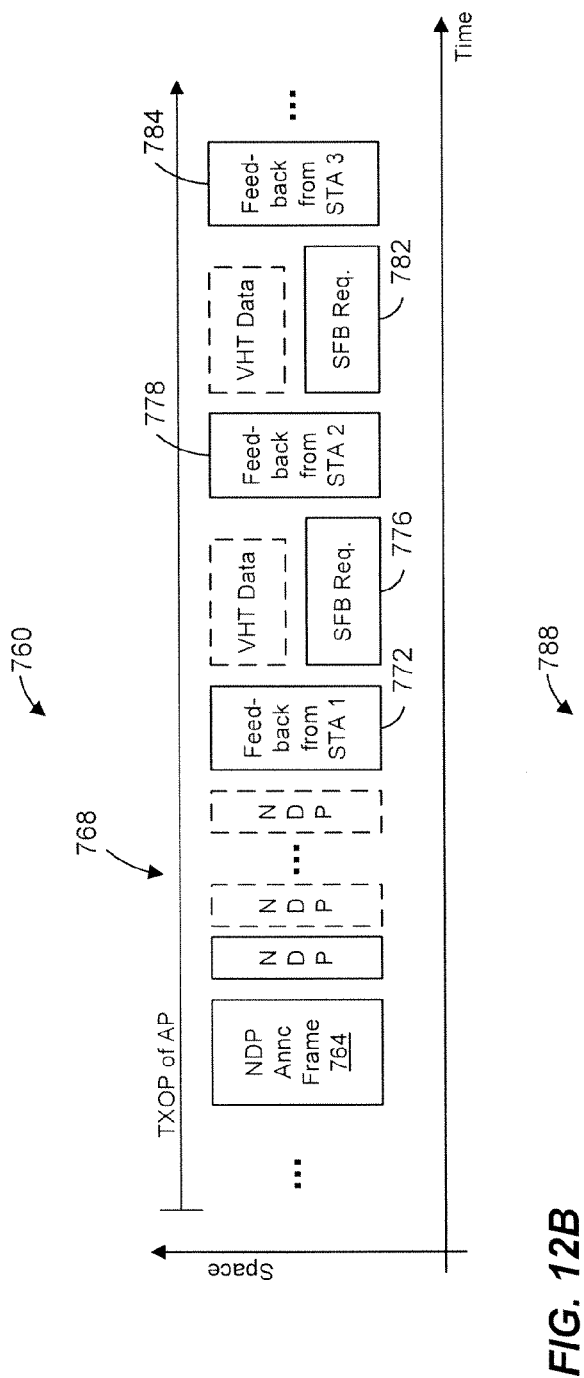
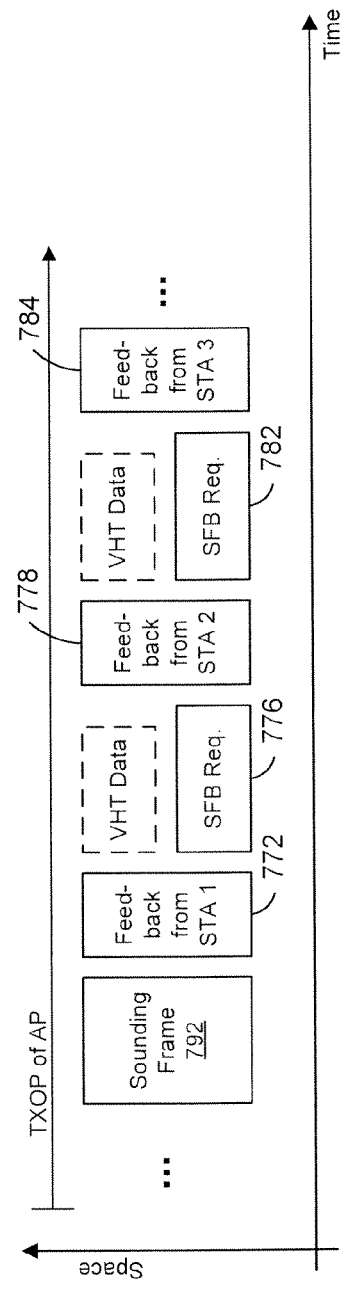
FIG. 12A
FIG. 12B

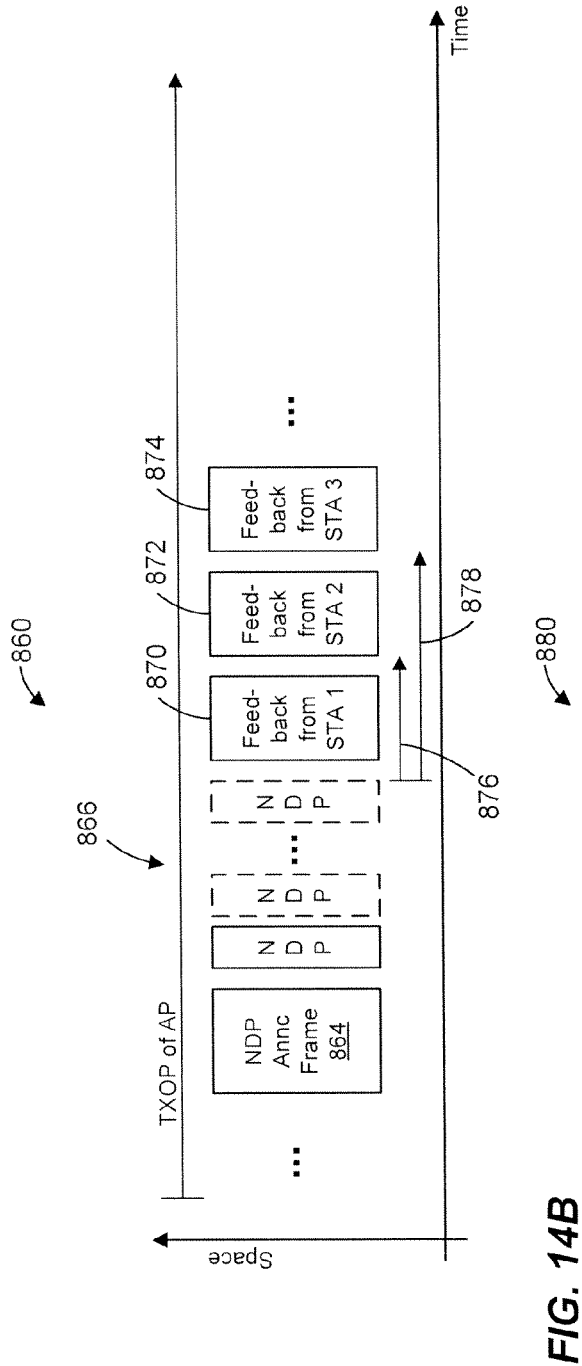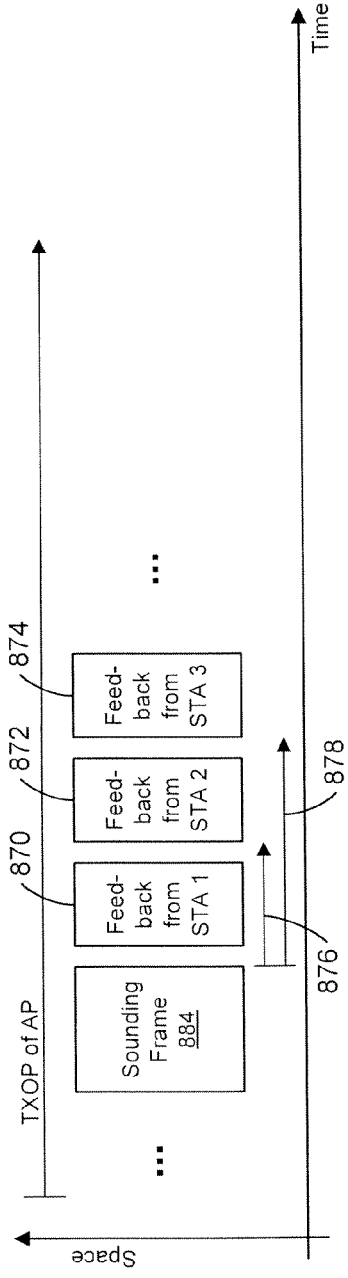
FIG. 14A
FIG. 14B

METHOD AND APPARATUS FOR SOUNDING MULTIPLE STATIONS

CROSS-REFERENCES TO RELATED APPLICATIONS

The present application claims the benefit of the following U.S. Provisional Patent Applications:

U.S. Provisional Patent Application No. 61/266,067, entitled "SDMA Sounding Supports," filed on Dec. 2, 2009;

U.S. Provisional Patent Application No. 61/303,231, entitled "SDMA Sounding Supports," filed on Feb. 10, 2010;

U.S. Provisional Patent Application No. 61/319,786, entitled "Common Sounding Mechanism for TGac," filed on Mar. 31, 2010;

U.S. Provisional Patent Application No. 61/322,259, entitled "SDMA Multi-User Selected Sounding," filed on Apr. 8, 2010;

U.S. Provisional Patent Application No. 61/357,882, entitled "VHT Sounding Support," filed on Jun. 23, 2010;

U.S. Provisional Patent Application No. 61/368,554, entitled "VHT Sounding Support," filed on Jul. 28, 2010; and U.S. Provisional Patent Application No. 61/370,631, entitled "VHT Sounding Support," filed on Aug. 4, 2010.

The disclosures of all of the above-referenced patent applications are hereby incorporated by reference herein in their entireties.

The present application is related to U.S. patent application No. 12/959,079, entitled "Method and Apparatus for Sounding Multiple Stations," filed on the same day as the present application, and which is hereby incorporated by reference herein in its entirety.

The present application is also related to U.S. patent application Ser. No. 12/850,529, entitled "SDMA Multi-Device Wireless Communications," filed on Aug. 4, 2010, and which is hereby incorporated by reference herein in its entirety.

FIELD OF TECHNOLOGY

The present disclosure relates generally to communication systems and, more particularly, to wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of tiling, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput

SUMMARY

In an embodiment, a method comprises determining one or more stations to provide sounding feedback in response to a training signal sequence, and determining a schedule for the one or more stations to provide sounding feedback based on capabilities of the one or more stations to transmit sounding feedback at a defined time period after an end of the training signal sequence. The method also comprises generating a communication frame that includes i) an indication of a request for the plurality of stations to provide sounding feedback corresponding to the training signal sequence, and ii) an indication of when the one or more stations are to transmit sounding feedback. Also, the method comprises transmitting the communication frame and/or causing the communication frame to be transmitted, and transmitting the training sequence and/or causing the training sequence to be transmitted. In another embodiment, a network interface is configured to perform the acts of the method described above.

In various embodiments, the method further comprises or the network interface is further configured to implement zero, one or more of the following features or any combination of one or more of the following features.

The indication of when the one or more stations are to transmit sounding feedback comprises a list of station identifiers in an order.

A first identifier in the list indicates a station that is to transmit sounding feedback at the defined time period after the end of the training signal sequence.

The communication frame includes an indicator of a number of identifiers in the list.

The indication of when the one or more stations are to transmit sounding feedback comprises an indication of a station that is to transmit sounding feedback at the defined time period after the end of the training signal sequence.

The indication of when the one or more stations are to transmit sounding feedback comprises an indication of whether the one or more stations are to transmit sounding feedback in a same transmit opportunity period in which the training signal sequence is transmitted or in one or more subsequent transmit opportunity periods.

The indication of when the one or more stations are to transmit sounding feedback comprises one or more indications of whether each of at least some of the one or more stations are to transmit sounding feedback in a same transmit opportunity period in which the training signal sequence is transmitted or a subsequent transmit opportunity period.

The communication frame includes sounding feedback parameters.

The communication frame includes sounding feedback parameters for each of the one or more stations.

Sounding feedback from one of the stations n the plurality of stations is received in a transmit opportunity period in which the training signal sequence is transmitted and without transmitting a polling signal to prompt the one station to transmit the sounding feedback.

BRIEF DESCRIPTION OF THE DRAWINGS

FIGS. 11A and 11B are diagrams of other example transmission sequences in a WLAN, according to some embodiments.

FIGS. 12A, 12B, 12C, and 12D are diagrams of other example transmission sequences in a WLAN, according to some embodiments.

FIGS. 14A and 14B are diagrams of other example transmission sequences in a WLAN, according to some embodiments.

DETAILED DESCRIPTION

Figure 1:
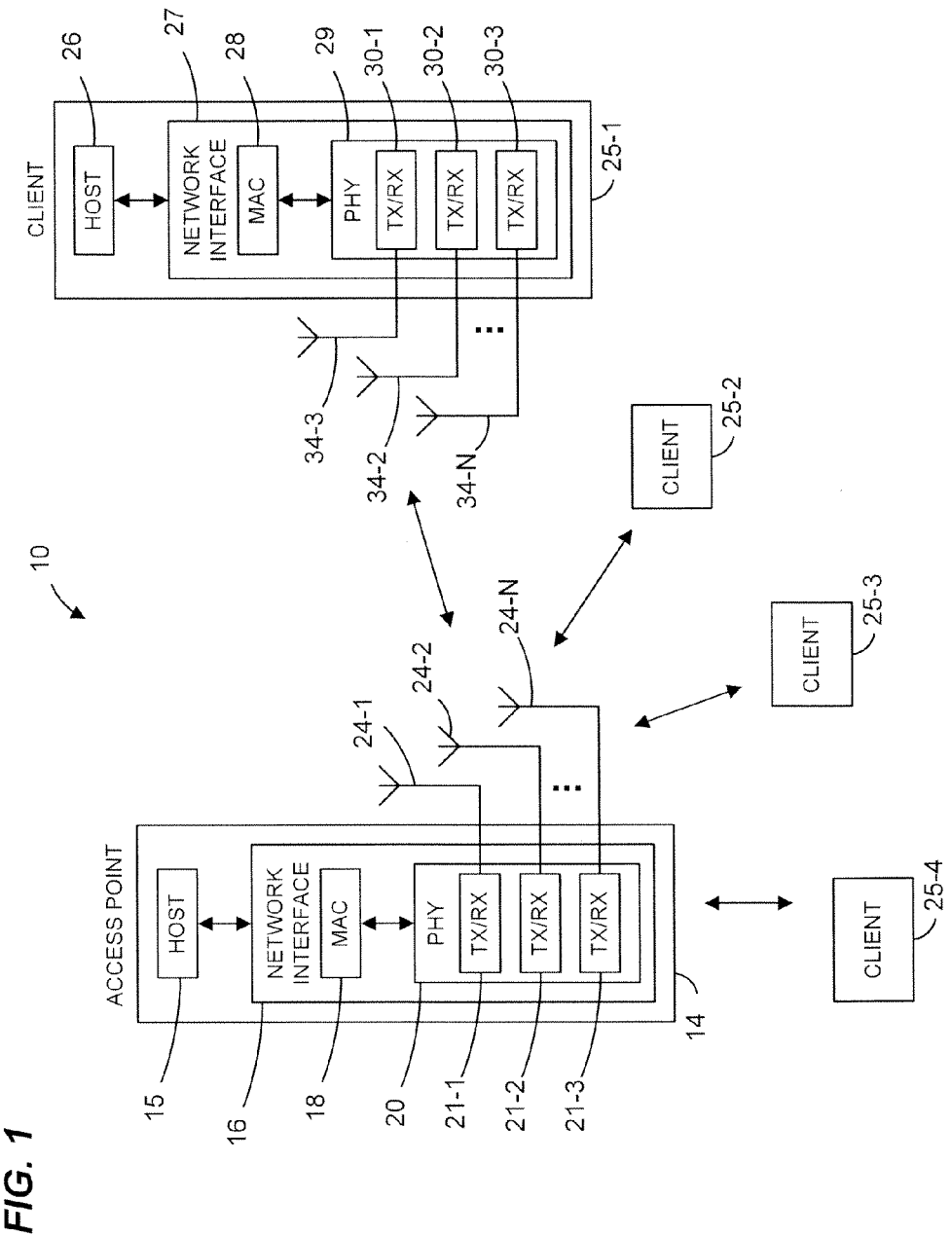
FIG. 1 is a block diagram of an example wireless local area network (WLAN) communication system in which an access point (AP) sends training signals to client devices (stations) and receives sounding feedback from the client devices, according to an embodiment.

In embodiments described below, wireless network devices such as an access point (AP) and client devices of a wireless local area network (WLAN) transmit data streams between the AP and the client devices. The AP and at least some of the client devices each include multiple antennas and are configured to utilize transmit and/or receive beamforming to enhance one or more of throughput, range, etc. Beamforming utilizes knowledge of the channel to determine a beamforming matrix to be applied to signals transmitted or received via multiple antennas. In some systems, obtaining explicit knowledge of the channel includes a beamformer transmitting known training signals to a beamformee, which then generates a measurement of the channel (sometimes referred to as channel state information or CSI) based on the received training signals. Transmitting such training signals is sometimes referred to as sounding a communication channel, or transmitting a sounding packet. In one implementation, the beamformee then transmits the CSI back to the beamformer, which then generates the beamforming matrix using the CSI. In another implementation, the beamformee uses the CSI to generate the beamforming matrix, and then transmits coefficients of the beamforming matrix back to the beamformer. Transmitting CSI or beamforming matrix information back to the beamformer is sometimes referred to as transmitting sounding feedback.

The transmission of the training signals and feedback corresponding to the training signals is considered overhead with respect to the WLAN, because user data is not being transmitted during transmission of the transmission of the training signals and feedback. Additionally, because the channel is not static and can change, the transmission of training signals and feedback is repeated periodically to ensure that beamforming matrices do not become outdated. In a WLAN that conforms to the IEEE 802.11n Standard, for example, in which there are many client devices in the WLAN, the time required for transmission of training signals and feedback may adversely affect throughput of the WLAN. For example, in the IEEE 802.11n Standard, a separate exchange of training signals and sounding feedback between a beamformer and multiple beamformees occurs for each beamformee.

In embodiments described below, a first communication device, such as an AP, determines a plurality of other communication devices, such as client devices, that are to transmit sounding feedback corresponding to a training signal sequence. The first communication device then transmits an indication of the plurality of other communication devices. The plurality of other communication devices uses this indication to then determine that they are to transmit sounding feedback to the first communication device. The first communication device also transmits the training signal sequence and the plurality of other communication devices, in response, transmit sounding feedback to the first communication device. In at least some embodiments and/or scenarios, overhead is reduced, as compared to sounding in the IEEE 802.11n Standard, for example, because the one transmission of the training signal sequence results in sounding feedback from multiple communication devices.

FIG. 1 is a block diagram of an example WLAN 10 in which devices such as an AP 14 and client devices 25 exchange information using OFDM (Orthogonal Frequency-Division Multiplexing) techniques in a multiple input, multiple output (MIMO) mode, according to an embodiment. The AP 14 includes a host processor 15 coupled to a network interface 16. The network interface 16 includes a medium access control (MAC) processing unit 18 and a physical layer processing unit 20. The PHY processing unit 20 includes a plurality of transceivers 21, and the transceivers are coupled to N antennas 24. In FIG. 1, the AP has the same number of transceivers 21 as antennas 24, but in other embodiments, the AP 14 includes different numbers of transceivers 21 and antennas 24. In FIG. 1, three transceivers 21 and three antennas 24 are illustrated, but in other embodiments, the AP 14 includes different numbers of transceivers 21 and antennas 24. (e.g., 1, 2, 4, 5, 6, 8, etc.) In one embodiment, the MAC processing unit 18 and the PHY processing unit 20 are configured to operate according to a communication protocol generally similar to the IEEE 802.11ac Standard (now in the process of being standardized), for example. Additionally, in some embodiments, the MAC processing unit 18 and/or the PHY processing unit 20 are configured to determine a set of the client devices 25 that are to transmit sounding feedback corresponding to a training signal sequence, and to cause the network interface 16 to transmit an indication of the set of client devices 25. The MAC processing unit 18 and/or the PHY processing unit 20 are configured to cause the network interface 16 to transmit the training signal sequence. Hereinafter, for convenience, a communication protocol that supports or specifies determining a set of the communication devices that are to transmit sounding feedback corresponding to a training signal sequence, and transmitting an indication of the set of communication devices is referred to herein as a "very high throughput protocol" or a "VHT protocol."

A client device 25-1 includes a host processor 26 coupled to a network interface 27. The network interlace 27 includes a MAC processing unit 28 and a PHY processing unit 29. The PHY processing unit 29 includes a plurality of transceivers 30, and the transceivers are coupled to a plurality of antennas 34. Although the same number of transceivers 30 and antennas 34 are illustrated in FIG. 1, the client device 25-1 includes different numbers of transceivers 30 and antennas 34, in other embodiments. Although three transceivers 30 and three antennas 34 are illustrated in FIG. 1, the client device 25-1 includes different numbers (e.g., 1, 2, 4, 5, etc.) of transceivers 30 and antennas 34 in other embodiments. The transceiver(s) 30 is/are configured to transmit generated data units via the antenna(s) 34. Similarly, the transceiver(s) 30 is/are configured to receive data units via the antenna(s) 34. The MAC processing unit 28 and/or the PHY processing unit 29 of the client device 25-1 are configured to process the indication of the set of client devices 25 and to determine if the client device 25-1 is included in the set of client devices 25. The MAC processing unit 28 and/or the PHY processing unit 29 are configured to process the received training signal sequence and to generate sounding feedback when it is determined that the client device 25-1 is included in the set of client devices 25. The MAC processing unit 28 and/or the PHY processing unit 29 are configured to cause the network interface 27 to transmit the sounding feedback to the AP 14 when it is determined that the client device 25-1 is included in the set of client devices 25.

In an embodiment, the MAC processing unit 28 and/or the PHY processing unit 29 of the client device 25-1 are configured to determine a different set of communication devices from the AP 14 and the client devices 25-2, 25-3, 25-4 that are to transmit sounding feedback corresponding to a training signal sequence from the client device 25-1, and to cause the network interface 27 to transmit an indication of the set of communication devices. The MAC processing unit 28 and/or the PHY processing unit 29 are configured to cause the network interface 27 to transmit the training signal sequence.

In this embodiment, the MAC processing unit 18 and/or the PHY processing unit 20 of the AP 14 are configured to process the indication of the set of communication devices and to determine if the AP 14 is included in the set of communication devices. The MAC processing unit 18 and/or the PHY processing unit 20 are configured to process the received training signal sequence and to generate sounding feedback when it is determined that the AP 14 is included in the set of communication devices. The MAC processing unit 18 and/or the PHY processing unit 20 are configured to cause the network interface 16 to transmit the sounding feedback to the client device 25-1 when it is determined that the AP 14 is included in the set of communication devices.

In an embodiment, one or both of the client devices 25-2 and 25-3 have a structure the same as or similar to the client device 25-1. In these embodiments, the client devices 25 structured like the client device 25-1 have the same or a different number of transceivers and antennas. For example, the client device 25-2 has only two transceivers and two antennas, according to an embodiment.

Figure 2:
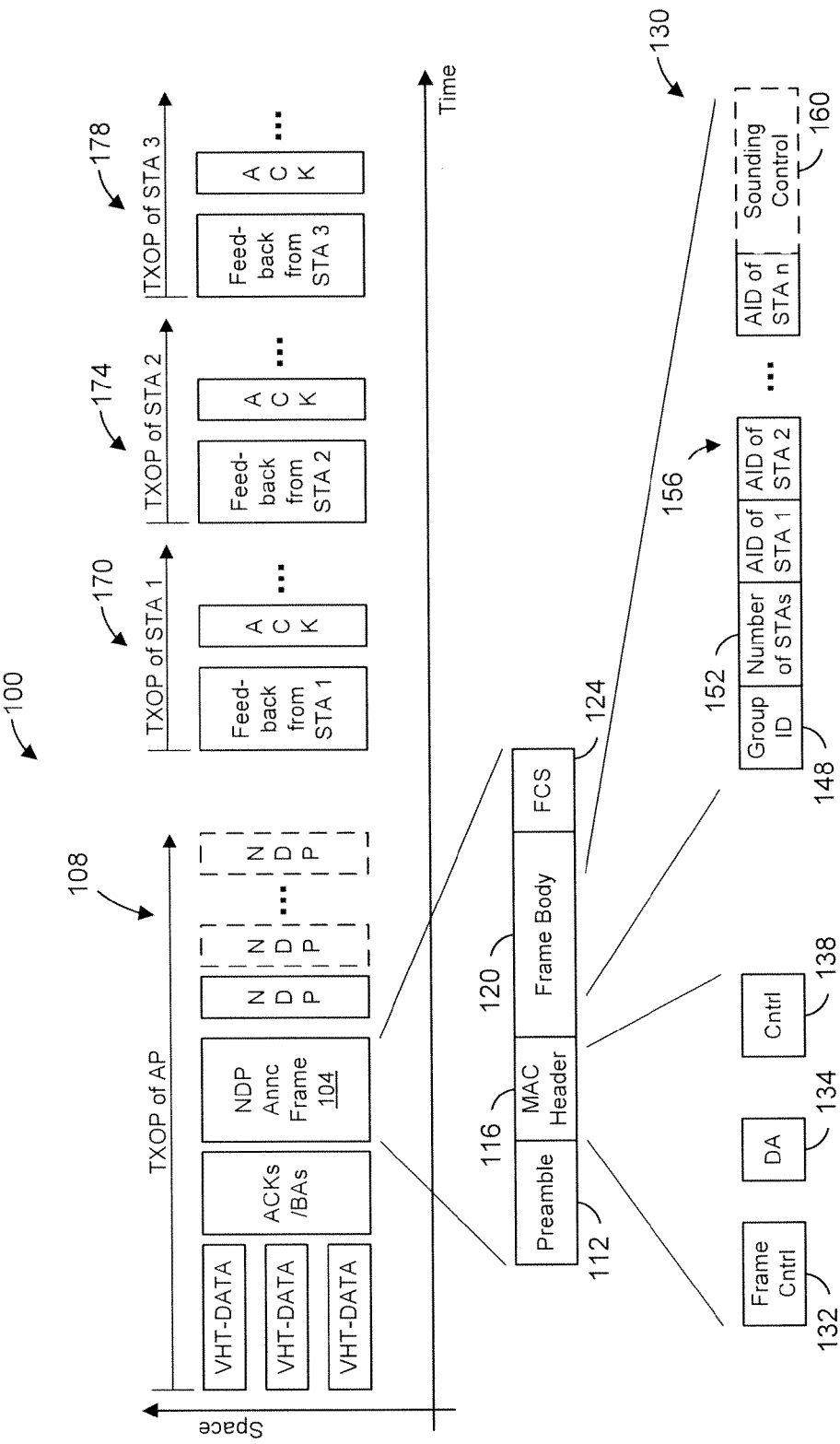
FIG. 2 is a diagram of an example transmission sequence in a WLAN, according to an embodiment.

FIG. 2 is a diagram of an example transmission sequence in a WLAN, such as the WLAN 10 of FIG. 1, according to an embodiment. For ease of explanation, FIG. 2 will be described with reference to FIG. 1. In some embodiments, however, the transmission sequence of FIG. 2 is carried out by system different than the system 10 of FIG. 1.

During a transmit opportunity period (TXOP) of an AP, the MAC processing unit 18 causes the network interface 16 to transmit a null data packet (NDP) announcement frame 104. Following the NDP announcement frame 104, the AP transmits one or more NDPs 108. Each NDP includes a plurality of training fields. In one embodiment, the network interface 16 transmits a training field for each spatial dimension in a MIMO channel, in an embodiment.

The NDP announcement frame 104 includes a preamble 112, a MAC header 116, a frame body 120, and a frame check sequence (FCS) 124. The frame body 120 includes a group definition field 130 that the MAC processing unit 18 uses to assign a plurality of client devices to a group. In some embodiments, and as illustrated in FIG. 2, the MAC processing unit 18 also uses the group definition field 130 to inform certain client devices that they are to provide sounding feedback to the AP, at least in some scenarios. For example, the MAC header 116 includes a frame control field 132, a destination address (DA) field 134, and a control field 138. In one embodiment, the MAC processing unit 18 sets the frame control field 132 to a value indicative of a management/control frame that should not be acknowledged (no ACK), the DA field 134 is set to a value indicative of a broadcast, and the control field 138 is set to a value indicative of an NDP announcement to indicate the frame 104 is a sounding announcement frame. In another embodiment, the MAC processing unit 18 sets the frame control field 132 to a value indicative of a sounding announcement to indicate the frame 104 is a sounding announcement frame. In another embodiment, the MAC processing unit 18 sets the frame control field 132 to a value indicative of a management/control frame that should be acknowledged (ACK).

The group definition field 130 includes a group identifier (ID) subfield 148 that indicates a group ID corresponding to the defined group of client devices. The group definition field 130 also includes an indication 152 of a number of client devices or stations in the defined group of client devices. A plurality of association identity (AID) subfields 156 indicate the one or more client devices or stations that are part of the defined group, i.e., each AID sub field 156 includes a respective identifier (e.g., an association identifier) of a respective client device in the defined group. In one embodiment, the number of AID subfields 156 is equal to the value indicated in the number of client devices subfield 152. In another embodiment, the number of AID subfields 156 is fixed. In this embodiment, if there are a smaller number of client devices in the group than the fixed number of AID subfields 156, the unused AID subfields 156 are set to a suitable value, such as zero, to indicate that they are not used.

The group definition field 130 also includes sounding control information 160. In the example illustrated in FIG. 2, the sounding control information 160 is included in a subfield separate from the other subfields of the group definition field 130. In some embodiments having a sounding control subfield separate from the other subfields of the group definition field, some or all of the sounding control information in the subfield applies to all client stations in the group and the some or all sounding control information is the same for all client stations. In some embodiments having a sounding control subfield separate from the other subfields of the group definition field, some or all of the sounding control information in the subfield applies to individual client stations in the group and the some or all sounding control information in the subfield can be different for different client stations. For example, the sounding control subfield can include a plurality of sub-subfields corresponding to the different client stations in the group. For instance, the plurality of sub-subfields corresponds to the plurality of AID subfields 156, in an embodiment. In other embodiments, at least some of the sounding control information 160 is included in other subfields of the group definition field 130, such as in the AID subfields 156. In some embodiments having sounding control information in the AID subfields 156, the sounding control information in each subfield 156 corresponds to the individual client station indicated by the subfield 156, and the sounding control information in the subfields 156 can be different for different client stations.

In an embodiment, the sounding control information 160 includes information that indicates whether a particular client device in the group specified in the group ID subfield 148 should transmit sounding feedback to the AP corresponding to the one or more NDPs 108. In other embodiments, the sounding control information 160 additionally or alternative includes information that indicates how client devices in the group specified in the group ID subfield 148 should transmit sounding feedback. For example, in one embodiment, the sounding control information 160 includes information that indicates one client device in the group that should transmit sounding feedback responsive to and/or immediately after the end of the last NDP in the one or more NDPs 108 (e.g., spaced from the end of the last NDP by a defined time period such as a short interframe space (SIFS)). As another example, in an embodiment, the sounding control information 160 includes scheduling information that indicates when at least some of the client devices in the group should transmit sounding feedback. As another example, in an embodiment, the sounding control information 160 includes an indication at least some of the client devices in the group should transmit sounding feedback in response to polling data frames transmitted by the AP. The sounding control information 160 can also include sounding feedback parameters for each client, such as feedback type, resolution, dimension, etc.

In one embodiment, each AID subfield 156 includes a number of bits larger than is necessary to represent the identifier of a client device. In this embodiment, one or more bits of the AID subfield 156 indicate whether the client station identified in the AID subfield 156 should generate and transmit sounding feedback. Similarly, in an embodiment, one or more bits of the AID subfield 156 indicate whether the client station identified in the AID subfield 156 should transmit sounding feedback responsive to and/or immediately after the end of the last NDP in the one or more NDPs 108.

In one embodiment, the order of client device identifiers set forth in the one or more AID subfields 156 indicate the order in which the client devices are to transmit sounding feedback. In this embodiment, the order of client device identifiers set forth in the one or more AID subfields 156 provides scheduling information for transmitting sounding feedback.

For client devices that should generate and transmit sounding feedback as indicated by the group definition field 130, the client devices transmit their sounding feedback after the one or more NDPs. In the example of FIG. 2, a first client station transmits sounding feedback in a TXOP 170 of the first client station. Similarly, a second client station transmits sounding feedback in a TXOP 174 of the second client station, and a third client station transmits sounding feedback in a TXOP 178 of the third client station. As will be explained subsequently, the sounding feedback may be transmitted in a variety of suitable ways such that the sounding feedback of different stations does not interfere with each other. For example, in various embodiments, the AP polls client devices for sounding feedback, the sounding feedback is transmitted in a specified order, the sounding feedback is transmitted in specified timeslots, etc.

Figure 3:
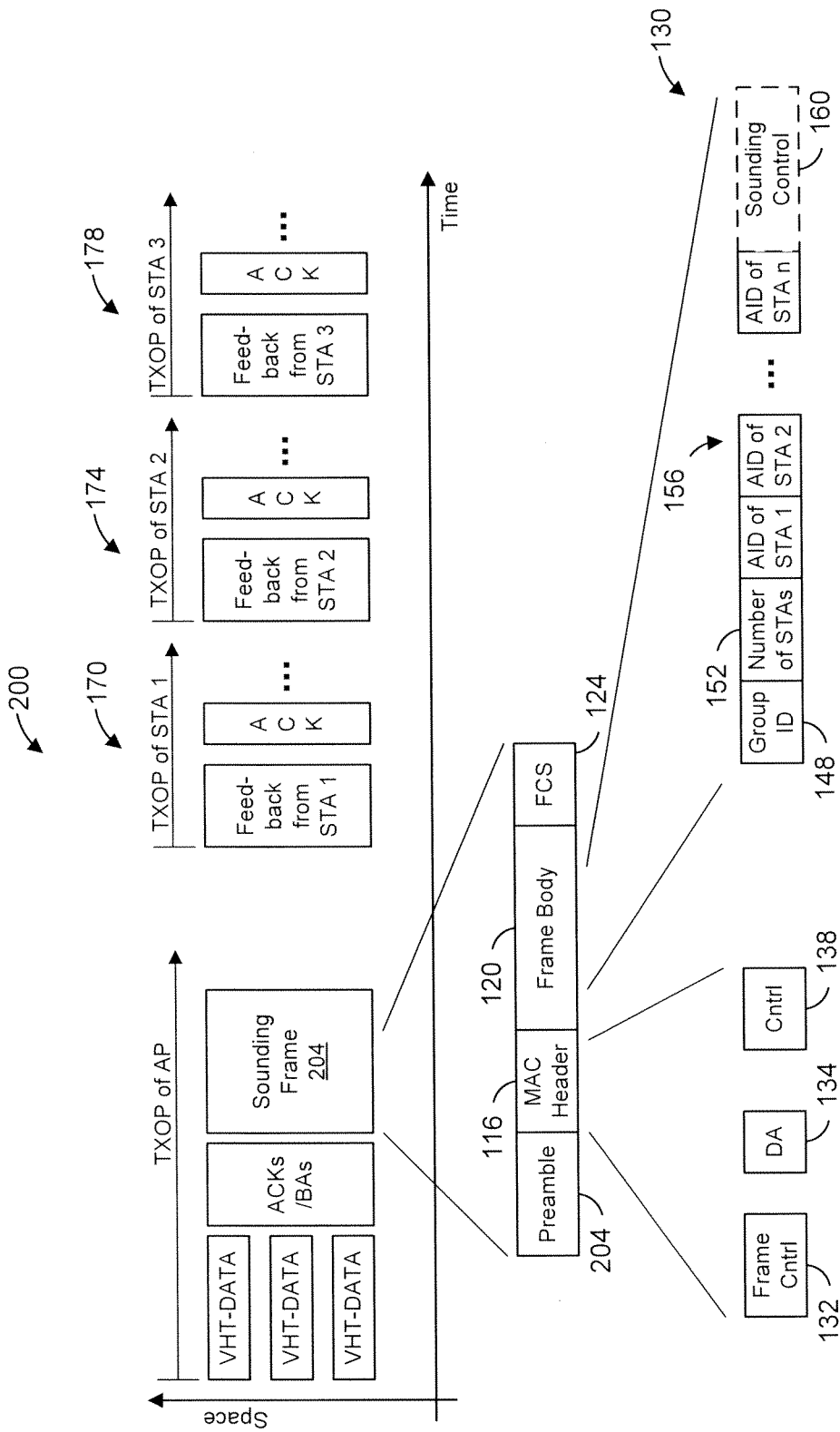
FIG. 3 is a diagram of another example transmission sequence in a WLAN, according to an embodiment.

FIG. 3 is a diagram of another example transmission sequence in a WLAN, such as the WLAN 10 of FIG. 1, according to an embodiment. During TXOP of an AP, the MAC processing unit 18 causes the network interface 16 to transmit a sounding frame 204 that includes a plurality of training fields. In one embodiment, the AP transmits a training field for each spatial dimension in a MIMO channel, in an embodiment.

In an embodiment, the sounding frame 204 includes a preamble 204 that includes a training field for each spatial dimension in a MIMO channel. The sounding frame 204 also includes the MAC header 116, the frame body 120, and the FCS 124 discussed with respect to FIG. 2. The frame body 120 includes the group definition field 130, discussed with respect to FIG. 2, that the MAC processing unit 18 uses to assign a plurality of client devices to a group and, in some embodiments, to inform certain client devices that they are to provide sounding feedback to the AP, at least in some scenarios. In one embodiment, the MAC processing unit 18 sets the frame control field 132 to a value indicative of a management/control frame for sounding, no ACK, and the DA field 134 is set to a value indicative of a broadcast. In one embodiment, the preamble 204 includes a field set with a value to indicate the frame 204 is a sounding frame. In another embodiment, the MAC processing unit 18 sets the frame control field 132 to a value indicative of a management/control frame, ACK. The group definition field 130 is the same as or similar to the group definition field 130 discussed with respect to FIG. 2.

Referring to FIGS. 2 and 3, in some embodiments, the sounding control information 160 is omitted from the group definition field 130.

Figure 4:
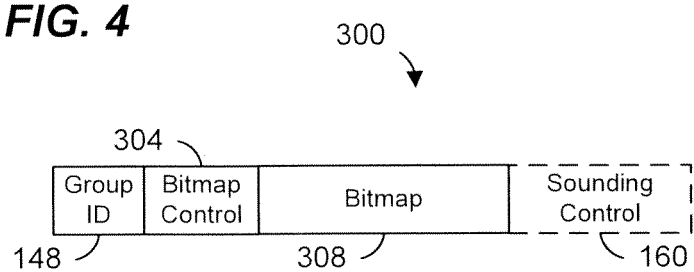
FIG. 4 is a diagram of an example a group definition field for assigning a plurality of client devices to a group, according to an embodiment.

Referring to FIGS. 2 and 3, in some embodiments, the indication 152 of the number of client devices or stations in the defined group of client devices and the plurality of AID subfields 156 is replaced with i) an AID bitmap control field that indicates an AID of a first client device in the group, and ii) a bitmap that is relative to the AID of the first client device and that indicates zero, one, or more other client devices in the group. For instance, the bits in the bitmap correspond to increasing AID values from the AID value in the AID bitmap control field. For example, say there are eight client devices having AID values of one through eight. If the MAC processing unit 18 set the AID bitmap control field to four, and sets the bitmap to 0101, this indicates that client devices with AID values four, six, and eight are members of the group. FIG. 4 is a diagram of an example a group definition field 300 having a bitmap control subfield 304 and a bitmap subfield 308 as discussed above, according to an embodiment. The group definition field 300 includes the sounding control information 160, in one embodiment, and in another embodiment, the group definition field 300 omits the sounding control information 160.

Figure 5A:
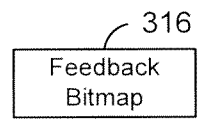
FIGS. 5A and 5B are diagrams of example fields including sounding control information, according to some embodiments.

FIG. 5A is a diagram of an example sounding feedback bitmap field 316 that is included as a separate subfield of the group definition field 130, 300. The sounding feedback bitmap field 316 is an example of sounding control information 160. In one embodiment, bits of the sounding feedback bitmap field 316 correspond to client devices specified by the AID subfields 156 (FIGS. 2 and 3) or the bitmap control subfield 340 and bitmap field 308 (FIG. 4). In one embodiment, the order of bits in the sounding feedback bitmap field 316 corresponds to the order of AID subfields 156 (FIGS. 2 and 3). In another embodiment, the order of bits in the sounding feedback bitmap field 316 corresponds to the order of bits in the bitmap 308 (FIG. 4). The MAC processing unit 18 sets a bit to a specified value (e.g., one) to indicate that the corresponding client device should generate and transmit sounding feedback, in an embodiment. In an embodiment, the bitmap control subfield 340 includes two or more bits to indicate sounding feedback parameters such as feedback type, resolution, dimension, etc.

Figure 5B:
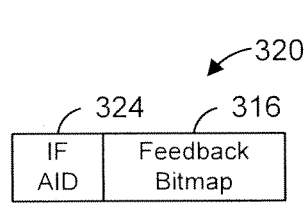

FIG. 5B is a diagram of a sounding control field 320 that is included as a separate subfield of the group definition field 130, 300. The sounding control field 320 is an example of sounding control information 160. The sounding control field 320 includes the sounding feedback bitmap field 316 of FIG. 5A and an immediate feedback (IF) field 324. The MAC processing unit 18 sets the IF field 324 to an AID value corresponding to a client device that is permitted to transmit sounding feedback in response to and/or immediately after the end of the last NDP in the one or more NDPs 108.

Figure 6A:
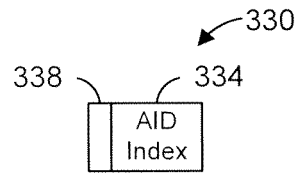
FIGS. 6A and 6B are diagrams of example fields including sounding control information, according to some embodiments.

FIG. 6A is a diagram of an example AID subfield 330 that is utilized in the group definition field 130, in some embodiments. The AID subfield 330 includes an AID 334 that indicates a client device that is to be included in the group specified by the group ID subfield 148 (FIGS. 2, 3). The AID subfield 330 also includes a bit 338 to indicate whether the client station specified by the AID 334 is expected to generate and transmit sounding feedback. The bit 338 is an example of sounding control information 160. In another embodiment, the AID subfield includes a subfield containing two or more bits (another example of sounding control information 160) to indicate the sounding feedback parameters. The MAC processing unit 18 sets the bit 338 to a specified value (e.g., one) to indicate that the client device should generate and transmit sounding feedback, in an embodiment.

Figure 6B:
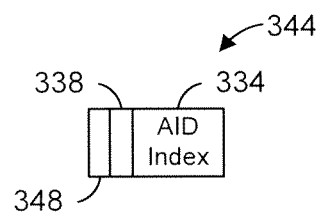

FIG. 6B is a diagram of an example AID subfield 344 that is utilized in the group definition field 130, in some embodiments. The AID subfield 234 includes the AID 334 and the bit 338 to indicate whether the client station specified by the AID 334 is to generate and transmit sounding feedback. The AID subfield 344 also includes an IF bit 348 to indicate whether the client station specified by the AID 334 is permitted to transmit sounding feedback at some later time within the current TXOP or during a later TXOP owned by the client device. In one embodiment, for one specific client device, the IF bit 348 indicates whether the client station specified by the AID 334 is permitted to transmit sounding feedback in response to and/or immediately after the end of the last NDP in the one or more NDPs 108. For example, if the IF bit 348 is set in a specific one of the AID subfields 344 (e.g., the first AID subfield after the number of stations subfield 152), this indicates that the indicated client device is permitted to transmit sounding feedback in response to and/or immediately after the end of the last NDP in the one or more NDPs 108. The bit 338 and the bit 348 are examples of sounding control information 160. In other embodiments, the AID subfield also includes other sounding control information such as sounding feedback parameters. The MAC processing unit 18 sets the bit 348 to a specified value (e.g., one) to indicate that the client device is permitted to transmit sounding feedback at a later time in the current TXOP or during a later TXOP owned by the client station, or, for a specific one of the AID fields 344, in response to and/or immediately after the end of the last NDP in the one or more NDPs 108, in an embodiment.

Figure 7A:
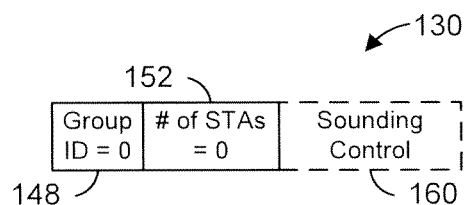
FIGS. 7A-7C are diagrams of an example group definition field illustrating different subfield values, in some embodiments.

In some embodiments, the AP can utilize a group definition field such as the group definition field 130 for one or more sounding functions that do not involve group definition. For example, in some embodiments the MAC processing unit 18 sets values of the group ID subfield 148 and the number of stations subfield 152 to indicate sounding functions that do not involve group definition. For example, FIG. 7A is a diagram of the group definition field 130, in an embodiment, where the MAC processing unit 18 has set the group ID subfield 148 to zero or some other suitable value and the number of stations subfield 152 to zero or some other suitable value. This indicates to the client stations that all client devices that receive the group definition field 130 should generate and transmit sounding feedback, in one embodiment. This indicates to the client stations that client devices new to the WLAN (e.g., not yet associated with the AP) and/or client devices that have detected channel degradation and/or signal degradation should generate and transmit sounding feedback, in another embodiment.

Figure 7B:
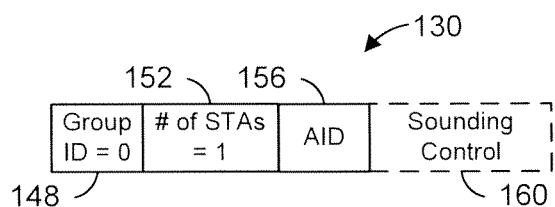

FIG. 7B is a diagram of the group definition field 130, in an embodiment, where the MAC processing unit 18 has set the group ID subfield 148 to zero or some other suitable value and the number of stations subfield 152 to one or some other suitable value to indicate a value of one. Additionally, the MAC processing unit 18 has set the AID subfield 156 to an AID of a station from which sounding feedback is requested. This indicates to the client device indicated in the subfield 156 that the indicated client device should generate and transmit sounding feedback, in an embodiment. Similarly, this indicates to all other client devices in the WLAN that these other client devices should not generate and transmit sounding feedback, in an embodiment.

Figure 7C:
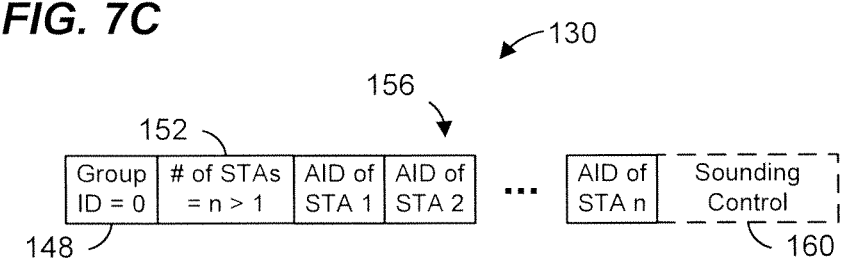

FIG. 7C is a diagram of the group definition field 130, in an embodiment, where the MAC processing unit 18 has set the group ID subfield 148 to zero or some other suitable value and the number of stations subfield 152 to indicate a number of client devices greater than one. Additionally, the MAC processing unit 18 has set the AID subfields 156 to include AID indices of a plurality of stations from which sounding feedback is requested. This indicates to the client devices indicated in the subfields 156 that the indicated client devices should generate and transmit sounding feedback, in an embodiment. Similarly, this indicates to all other client devices in the WLAN that these other client devices should not generate and transmit sounding feedback, in an embodiment. In one embodiment, the group definition field 130 of FIG. 7C utilizes a bitmap control field and a bitmap, such as the bitmap control field 304 and the bitmap 308 of FIG. 4, instead of the number of stations subfield 152 and the subfields 156.

In the embodiments discussed with respect to FIGS. 7A-7C, the field 130 is not used to define a group of client devices. Rather, the field 130 is used to request sounding feedback from client stations. As discussed with respect to FIGS. 2-4, 5A, 5B, 6A, and 6B, the group definition fields 130 of FIGS. 7A-7C includes sounding control information 160, in some embodiments. In other embodiments, the group definition fields 130 of FIGS. 7A-7C omit sounding control information 160.

Referring to FIGS. 2-4 and 7A-7C, in some embodiments, a single field 130, 300 is utilized by the AP to perform two or more of i) request sounding feedback from client devices belonging to a group indicated by the group ID subfield 148, ii) invite sounding feedback from all client devices that receive the field 130 (e.g., client devices new to the WLAN and/or client devices that detect channel/signal degradation should send sounding feedback, whereas other client devices need not), iii) request sounding feedback from a particular one client device indicated by the AID subfield 156 without specifying a group ID, or iv) request sounding feedback from particular client devices indicated by the AID subfields 156 and without specifying a group ID. With regard to items iii) and iv), the specified client device(s) may not yet have been assigned to a group, in some scenarios. With regard to item iv), the specified client devices may belong to multiple different groups, in some scenarios. In one embodiment, the MAC processing unit 18 sets the group ID subfield 148 and the number of stations field 152 to different values in order to indicate for which of the functions i), iii), and iv) the field 130 is being utilized.

In some embodiments, the MAC processing unit 18 utilizes a field similar the group definition field 130 discussed above to request sounding feedback from one or more client devices and without defining a group. For example, if a group has been defined previously and assigned a group ID, the AP can request sounding feedback from client devices in the group by using the group ID.

Figure 8A:
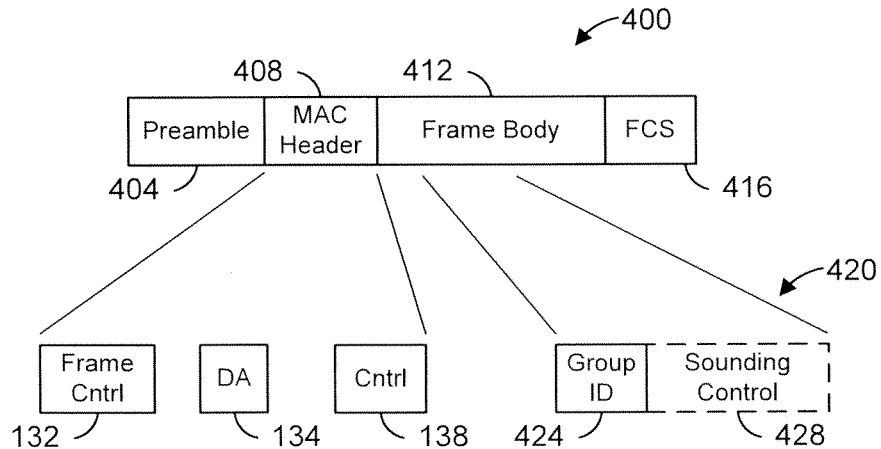
FIGS. 8A and 8B are diagrams of example null data packet (NDP) announcement frames, according to some embodiments.

FIG. 8A is a diagram of an example frame 400 that is utilized as an NDP announcement frame (similar to frame 104 of FIG. 2) or as a sounding frame (similar to frame 204 of FIG. 3), according to an embodiment. The frame 400 is utilized by the AP to request sounding feedback from a previously defined group of client devices that have been assigned a group ID, in an embodiment and in some scenarios. The frame 400 includes a preamble 404, a MAC header 408, a frame body 412 and an FCS 416. If the frame 400 is utilized as a sounding frame, the preamble 404 includes a training field for each spatial dimension in a MIMO channel. The MAC header 408 includes the frame control field 132, the DA field 134, and the control field 138 discussed above with respect to FIGS. 2 and 3. In one embodiment, the MAC processing unit 18 sets the frame control field 132 to a value indicative of a management/control frame, no ACK, the DA field 134 is set to a value indicative of a broadcast. In another embodiment, the MAC processing unit 18 sets the frame control field 132 to a value indicative of a management/control frame, ACK. If the frame 400 is utilized as an NDP announcement frame, the MAC processing unit 18 sets the control field 138 or the frame type field in the frame control field 132 to a value indicative of an NDP announcement.

The frame body 412 includes a field 420 having a group ID subfield 424. The MAC processing unit 18 sets the group ID subfield 424 to indicate a group of client devices that should generate and transmit sounding feedback. In one embodiment, the field 420 includes sounding control information 428 similar to the sounding control information 160 discussed above. For example, the control information 428 indicates certain client devices in the specified group should generate and transmit sounding feedback and indicates other client devices in the specified should not generate and transmit sounding feedback, in an embodiment. The sounding control information 428 can also indicate sounding feedback parameters for the client devices requested to send sounding feedback.

Figure 8B:
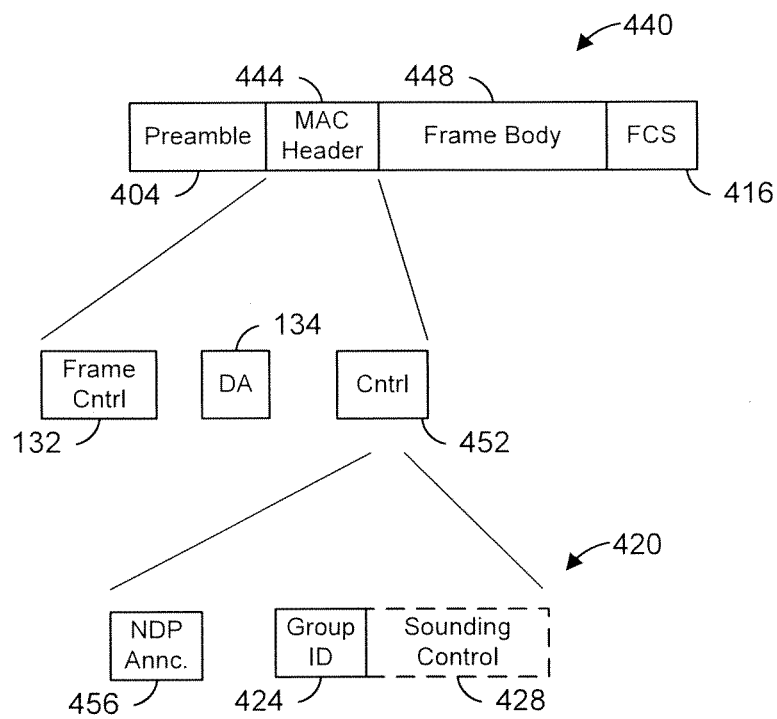

FIG. 8B is a diagram of an example frame 440 that is utilized as an NDP announcement frame (similar to frame 104 of FIG. 2) or as a sounding frame (similar to frame 204 of FIG. 3), according to an embodiment. In other embodiments, the frame 440 is utilized as other types of frames as well. The frame 440 includes the preamble 404, a MAC header 444, a frame body 448, and the FCS 416. If the frame 440 is utilized as a sounding frame, the preamble 404 includes a training field for each spatial dimension in a MIMO channel. The MAC header 444 includes the frame control field 132, the DA field 134 discussed above with respect to FIGS. 2 and 3. The MAC header 444 also includes a control field 452. In one embodiment, the MAC processing unit 18 sets the frame control field 132 to a value indicative of a management/control frame, no ACK, the DA field 134 is set to a value indicative of a broadcast. In another embodiment, the MAC processing unit 18 sets the frame control field 132 to a value indicative of a management/control frame, ACK.

The control field 452 includes an NDP announcement subfield 456. If the frame 440 is utilized as an NDP announcement frame, the MAC processing unit 18 sets the NDP announcement subfield 456 or the frame type of the frame control field 132 to a value indicative of an NDP announcement. The control field 452 also includes the field 420 discussed above with respect to FIG. 8A.

The MAC processing unit 18 sets the group ID subfield 424 in the control field 452 to indicate a group of client devices that should generate and transmit sounding feedback. In one embodiment, the field 420 includes sounding control information 428 similar to the sounding control information 160 discussed above. For example, the control information 428 indicates certain client devices in the specified group should generate and transmit sounding feedback and indicates other client devices in the specified should not generate and transmit sounding feedback, in an embodiment.

In some embodiments and/or scenarios, the frame body 448 is omitted.

Figure 9:
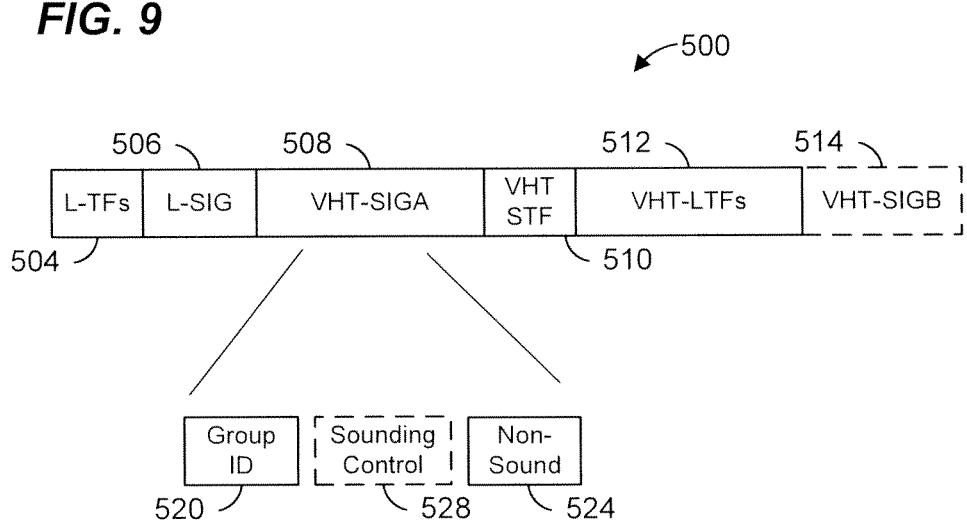
FIG. 9 is a diagram of an example physical layer (PHY) preamble that is utilized in an NDP announcement frame or as a sounding frame, according to an embodiment.

In some embodiments, a PHY preamble includes information that informs certain client devices that they are to provide sounding feedback to the AP, at least in some scenarios. FIG. 9 is a diagram of an example PHY preamble 500 that is utilized in an NDP announcement frame (similar to frame 104 of FIG. 2) or as a sounding frame (similar to frame 204 of FIG. 3), according to an embodiment. In other embodiments, the preamble 500 is utilized as other types of frames as well, such as an NDP. The preamble 500 includes legacy training fields (L-TFs) 504, a legacy signal field (L-SIG) 506, a signal field (VHT-SIGA) 508, a short training field (VHT-STF) 510, and long training fields (VHT-LTFs) 512. In one embodiment, the preamble 500 also includes a further VHT signal field (VHT-SIGB) 514 at least in some scenarios. If the preamble 500 is utilized in a sounding frame, the VHT-LTFs 512 includes a training field for each spatial dimension in a MIMO channel.

The VHT-SIGA 508 includes a group ID field 520 and a non-sounding field 524. In one embodiment, the non-sounding field 524 includes a single bit, and if the preamble 500 is utilized in a sounding frame, the single bit of the non-sounding field 524 is set to a suitable value such as zero to indicate the frame is a sounding frame. For example, the MAC processing unit 18 causes the PHY processing unit 20 to set the single bit of the non-sounding field 524 to a suitable value such as zero to indicate that the frame is a sounding frame, in an embodiment. The group ID field 520 is set to indicate a group of client devices that are to generate and transmit sounding feedback. For example, the MAC processing unit 18 causes the PHY processing unit 20 to set the group ID subfield 424 to indicate a group of client devices that should generate and transmit sounding feedback.

In an embodiment, the VHT-SIGA 508 includes a sounding control information 528. The sounding control information 528 is similar to the sounding control information 160 discussed above. For example, the sounding control information 528 includes a bitmap and/or IF field such as described with respect to FIGS. 5A and 5B. For example, the MAC processing unit 18 causes the PHY processing unit 20 to set the sounding control information 528 to indicate which client devices in the group of client devices should generate and transmit sounding feedback, which client device (if any) is permitted to provide immediate sounding feedback (e.g., in response to and/or immediately after the end of the NDPs 108), etc. In other embodiments, the VHT-SIGA 508 does not include the sounding control information 528.

In an embodiment, when the preamble includes the group ID and sounding control information 528, an NDP frame (with preamble only) can serve as both an NDP announcement and for sounding. In this embodiment, a standalone NDP Announcement frame is no longer needed. For example, a single NDP frame can serve as an announcement of itself, in an embodiment.

In other embodiments, the preamble 500 is formatted according to the IEEE 802.11n Standard, and includes a high throughput signal field (HT-SIG), a high throughput short training field (HT-STF), and high throughput long training fields (HT-LTFs). In these embodiments, the HT-SIG field is modified to include a group ID subfield. In one embodiment, the HT-SLG field also includes sounding control information. In another embodiment, the HT-SIG field omits sounding control information. In one embodiment, the group ID and the sounding information, if included, are included in fields currently reserved by the IEEE 802.11n Standard.

Figure 10:
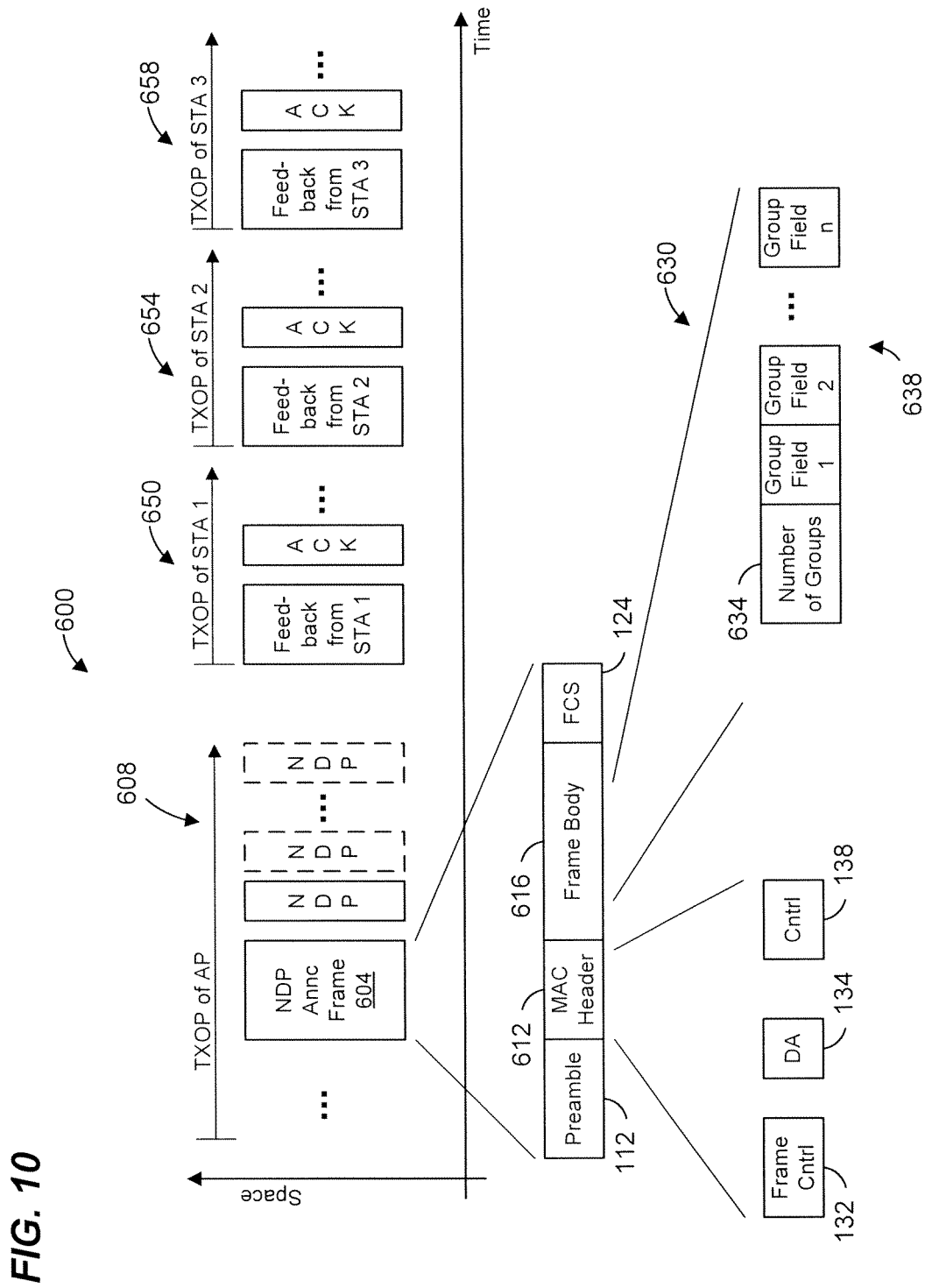
FIG. 10 is a diagram of another example transmission sequence in a WLAN, according to an embodiment.

In some embodiments, a single frame is utilized to request sounding feedback from a plurality of different groups of client stations. FIG. 10 is a diagram of an example transmission sequence 600 in a WLAN, such as the WLAN 10 of FIG. 1, according to an embodiment. For ease of explanation, FIG. 10 will he described with reference to FIG. 1. In some embodiments, however, the transmission sequence of FIG. 10 is carried out by system different than the system 10 of FIG. 1.

During a TXOP of an AP, the MAC processing unit 18 causes the network interface 16 to transmit an NDP announcement frame 604. The MAC processing unit 18 causes the network interface 16 to transmit one or more NDPs 608 following the NDP announcement frame 604. Each NDP 608 includes a plurality of training fields. In one embodiment, the network interface 16 transmits a training field for each spatial dimension in a MIMO channel, in an embodiment.

The NDP announcement frame 604 includes the preamble 112, a MAC header 612, a frame body 616, and the FCS 124. The frame body 616 includes a group sounding field 630 that the MAC processing unit 18 uses to request sounding feedback from one or more groups of client devices, at least in some scenarios. For example, the MAC header 612 includes the frame control field 132, the DA field 134, and a control field 138. In one embodiment, the MAC processing unit 18 sets the frame control field 132 to a value indicative of a management/control frame, no ACK, and sets the DA field 134 to a value indicative of a broadcast. In another embodiment, the MAC processing unit 18 sets the frame control field 132 to a value indicative of a management/control frame that should be acknowledged (ACK). In some embodiments, the MAC processing unit 18 sets the control field 138 to a value indicative of an NDP announcement to indicate the frame 604 is a sounding announcement frame.

The group sounding field 630 includes a number of groups subfield 634 that indicates a number of groups for which sounding feedback is being requested. The group sounding field 630 also includes one or more group subfields 638. In one embodiment, each group subfield 638 includes a group ID subfield that indicates a group ID. In one embodiment, the number of subfields 638 is equal to the value indicated in the number of groups subfield 634. In another embodiment, the number of subfields 638 is fixed. In this embodiment, if there are a smaller number of groups than the fixed number of subfields 638, the unused subfields 638 are set to a suitable value, such as zero, to indicate that they are not used.

In one embodiment, each group subfield 638 also includes sounding control information. In an embodiment, the sounding control information includes information that indicates whether a particular client device in the group specified in the group ID subfield should transmit sounding feedback to the AP corresponding to the one or more NDPs 608. In other embodiments, the sounding control information additionally or alternative includes information that indicates how client devices in the group specified in the group ID subfield should transmit sounding feedback. For example, in one embodiment, the sounding control information includes information that indicates one client device in all of the groups that should transmit sounding feedback responsive to and/or immediately after the end of the last NDP in the one or more NDPs 108. As another example, in an embodiment, the sounding control information includes scheduling information that indicates when at least some of the client devices in the group should transmit sounding feedback. As another example, in an embodiment, the sounding control information includes an indication at least some of the client devices in the group should transmit sounding feedback in response to polling data frames transmitted by the AP.

In one embodiment, for each group, the order of client device identifiers set forth in one or more AID subfields of a previously transmitted group definition field indicate the order in which the client devices are to transmit sounding feedback with respect to the group. Similarly, the order of the group subfields 638 indicates the order in which the groups are to transmit sounding feedback with respect to each other. In this embodiment, the order of client device identifiers set forth in the AID subfields of previously sent group definition fields and the order of the group subfields 638 provides scheduling information for transmitting sounding feedback.

For client devices that should generate and transmit sounding feedback as indicated by the group sounding field 630, the client devices transmit their sounding feedback after the one or more NDPs 608. In the example of FIG. 10, a first client station transmits sounding feedback in a TXOP 650 of the first client station. Similarly, a second client station transmits sounding feedback in a TXOP 654 of the second client station, and a third client station transmits sounding feedback in a TXOP 658 of the third client station. As will be explained subsequently, the sounding feedback may be transmitted in a variety of suitable ways such that the sounding feedback of different stations does not interfere with each other. For example, in various embodiments, the AP polls client devices for sounding feedback, the sounding feedback is transmitted in a specified order, the sounding feedback is transmitted in specified timeslots, etc.

In some embodiments, sounding feedback transmitted in response to and/or immediately after the end of the one or more NDPs 608 (i.e., immediate feedback) is not permitted for any client device. In these embodiments, the indication of a client device permitted to transmit sounding feedback in response to and/or immediately after the end of the one or more NDPs 608 is omitted from the various examples of sounding control information discussed above. In at least some of these embodiments, each client device transmits sounding feedback in the TXOP owned by the client device. In other embodiments, client devices transmit sounding feedback according to a schedule and/or in response to polling requests from the AP.

Several examples of sounding feedback techniques will now be described.

FIG. 11A is a diagram of an example transmission sequence 700 in a WLAN, such as the WLAN 10 of FIG. 1, according to an embodiment. For ease of explanation, FIG. 11A will be described with reference to FIG. 1. In some embodiments, however, the transmission sequence of FIG. 11A is carried out by system different than the system 10 of FIG. 1.

During a TXOP of an AP, the MAC processing unit 18 causes the network interface 16 to transmit an NDP announcement frame 704. The MAC processing unit 18 causes the network interface 16 to transmit one or more NDPs 708 following the NDP announcement frame 704. Each NDP 708 includes a plurality of training fields. In one embodiment, the network interface 16 transmits a training field for each spatial dimension in a MIMO channel, in an embodiment.

The NDP announcement frame 704 includes sounding control information, such as described above, that indicates a client device that is permitted to transmit sounding feedback in response to and/or immediately after the end of the one or more NDPs 708. Thus, the indicated client station transmits sounding feedback 712 during the TXOP of the AP.

For other client devices that should generate and transmit sounding feedback as indicated by the NDP announcement frame, the client devices transmit their sounding feedback after the end of the TXOP of the AP. In the example of FIG. 11A, a client station transmits sounding feedback in its own TXOP 716. Similarly, another client station transmits sounding feedback in its own TXOP 720.

FIG. 11B is a diagram of an example transmission sequence 730 in a WLAN, such as the WLAN 10 of FIG. 1, according to an embodiment. The sequence 730 is the same as the sequence 700 of FIG. 11A, except that the AP transmits a sounding frame 734 rather than an NDP announcement frame 704 and one or more NDPs 708.

FIG. 12A is a diagram of an example transmission sequence 760 in a WLAN, such as the WLAN 10 of FIG. 1, according to an embodiment. For ease of explanation, FIG. 12A will be described with reference to FIG. 1. In some embodiments, however, the transmission sequence of FIG. 12A is carried out by system different than the system 10 of FIG. 1.

During a TXOP of an AP, the MAC processing unit 18 causes the network interface 16 to transmit an NDP announcement frame 764. The MAC processing unit 18 causes the network interface 16 to transmit one or more NDPs 768 following the NDP announcement frame 704. Each NDP 768 includes a plurality of training fields. In one embodiment, the network interface 16 transmits a training field for each spatial dimension in a MIMO channel, in an embodiment.

The NDP announcement frame 764 includes sounding control information, such as described above, that indicates a client device that is permitted to transmit sounding feedback in response to and/or immediately after the end of the one or more NDPs 768. Thus, the indicated client station transmits sounding feedback 772 during the TXOP of the AP.

For other client devices that should generate and transmit sounding feedback as indicated by the NDP announcement frame, the AP transmits a sounding feedback (SFB) request for each client device that has not yet transmitted SFB. In response to each SFB request, a client device client transmits its SFB For example, the MAC processing unit 18 causes the network interface 16 to transmit an SFB request 776 to a client device STA 2. In response to the SFB request 776, the client device STA 2 transmits SFB 778. Similarly, the MAC processing unit 18 causes the network interface 16 to transmit an SFB request 782 to a client device STA 3. In response to the SFB request 782, the client device STA 3 transmits SFB 784. The SFB requests 776, 782 and the SFB 772, 778, 784 are transmitted during the TXOP of the AP.

FIG. 12B is a diagram of an example transmission sequence 788 in a WLAN, such as the WLAN 10 of FIG. 1, according to an embodiment. The sequence 788 is the same as the sequence 760 of FIG. 12A, except that the AP transmits a sounding frame 792 rather than an NDP announcement frame 764 and one or more NDPs 768.

Figure 12C:
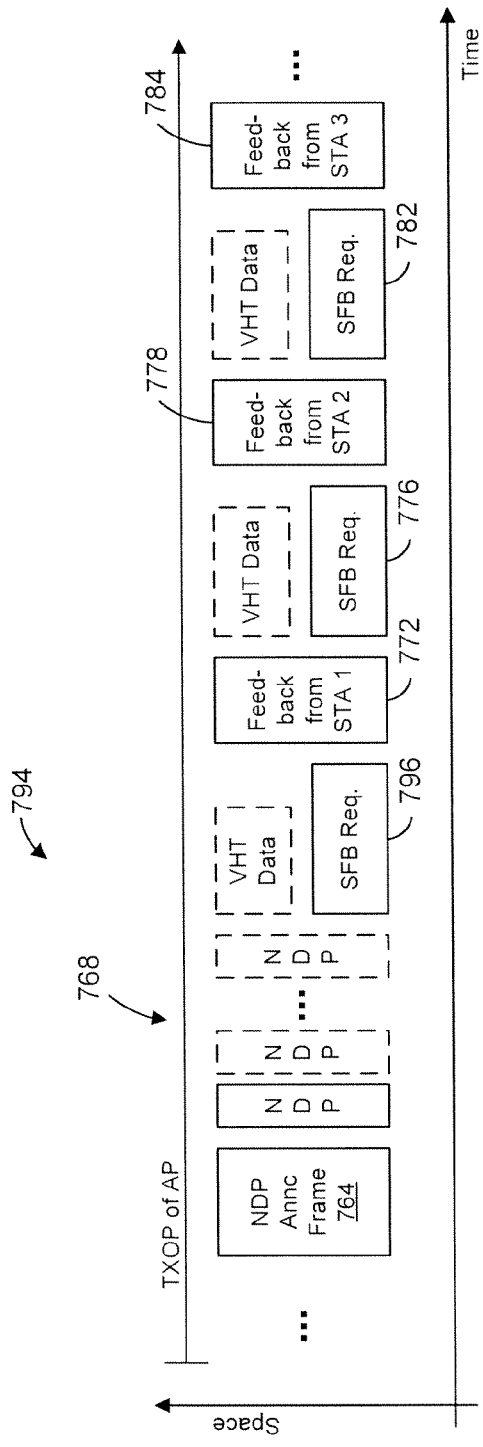

FIG. 12C is a diagram of an example transmission sequence 794 in a WLAN, such as the WLAN 10 of FIG. 1, according to an embodiment. The sequence 794 is the same as the sequence 760 of FIG. 12A, except that no client device transmits SFB immediately after the last NDP 768. Rather, every client device is polled by the AP, including the first client device, which is polled by an SFB request 796.

Figure 12D:
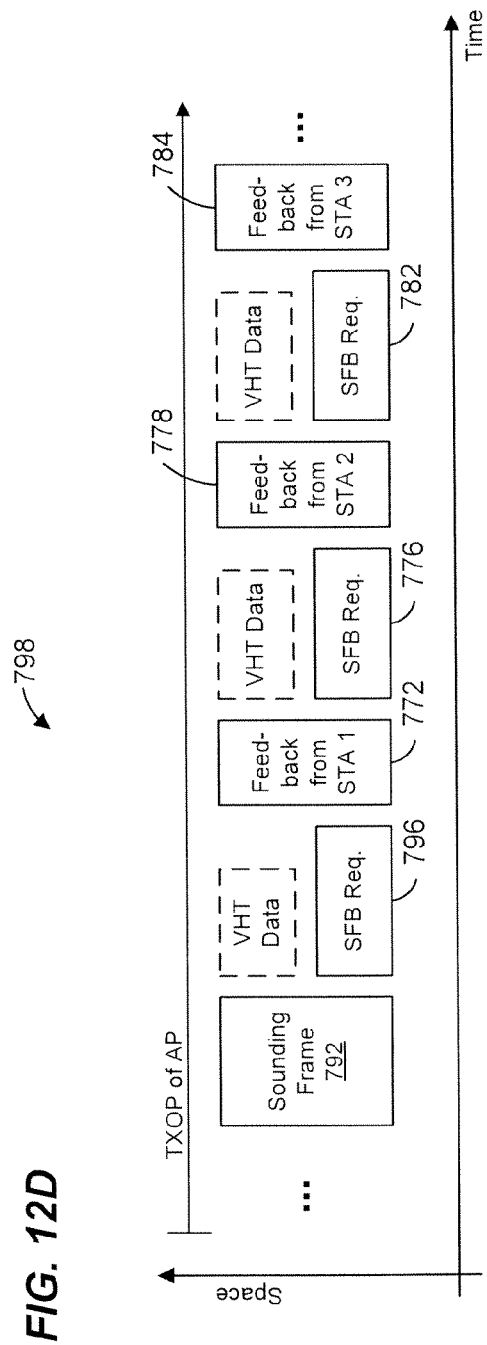

FIG. 12D is a diagram of an example transmission sequence 798 in a WLAN, such as the WLAN 10 of FIG. 1, according to an embodiment. The sequence 798 is the same as the sequence 788 of FIG. 12B, except that no client device transmits SFB immediately after the last NDP 768. Rather, every client device is polled by the AP, including the first client device, which is polled by the SFB request 796.

If a client device is not yet ready to transmit SFB when the client device is polled (with an SFB request), the client device defers transmitting the SFB, in an embodiment and in some scenarios. For example, in response to the SFB request, the client device transmits an ACK without SFB or does not respond at all. In another embodiment, if a client device is not yet ready to transmit SFB when the client device is polled (with an SFB request) but has generated partial SFB, the client device transmits the partial SFB with an indication that the SFB is partial, in an embodiment and in some scenarios. After the remainder of the SFB is ready, the client transmits the remaining SFB to the AP in the same TXOP of the AP or in a TXOP of the client device, in an embodiment.

In one embodiment, an SFB request such as in FIGS. 12A and 12B comprises a block acknowledgment request (BAR) transmitted to a particular client device (e.g., by setting the DA to the address of the client device). In this embodiment, the BAR includes an indication of an immediate ACK/block acknowledgment (BA)/response request. In response to the BAR, the client device transmits the SFB to the AP if the SFB is ready to be transmitted. Similarly, in another embodiment, an SFB request comprises a data frame with an indication of an immediate ACK/BA/response request. In response to the data frame, the client device transmits the SFB to the AP if the SFB is ready to be transmitted. In another embodiment, the SFB request is transmitted in an NDP announcement frame. In another embodiment, the SFB request is transmitted in a sounding frame. In another embodiment, the SFB request is transmitted in a simplified sounding frame, such as a sounding frame comprising a MAC header and omitting a frame body or an NDP. In one embodiment, the SFB request is transmitted in a frame type reserved for SFB requests.

In some embodiments, the client device transmits the SFB in an ACK/BA/response frame. In other embodiments, the client device transmits the SFB in a data frame. In one embodiment, the client device transmits the SFB in a frame type reserved for SFB.

In one embodiment, an SFB request is indicated by an SFB request field (e.g., flag) in a control field of a PHY preamble (e.g., in the VHT-SIGA 508 or the VHT-SIGB 514 of FIG. 9). In another embodiment, the SFB request is indicated by an SFB request field in a MAC header. In another embodiment, the STB request is indicated by an SFB request field in a frame body. In one embodiment, the SFB request field is included in a data frame. In another embodiment, the SFB request field is included in a BAR frame.

Figure 13A:
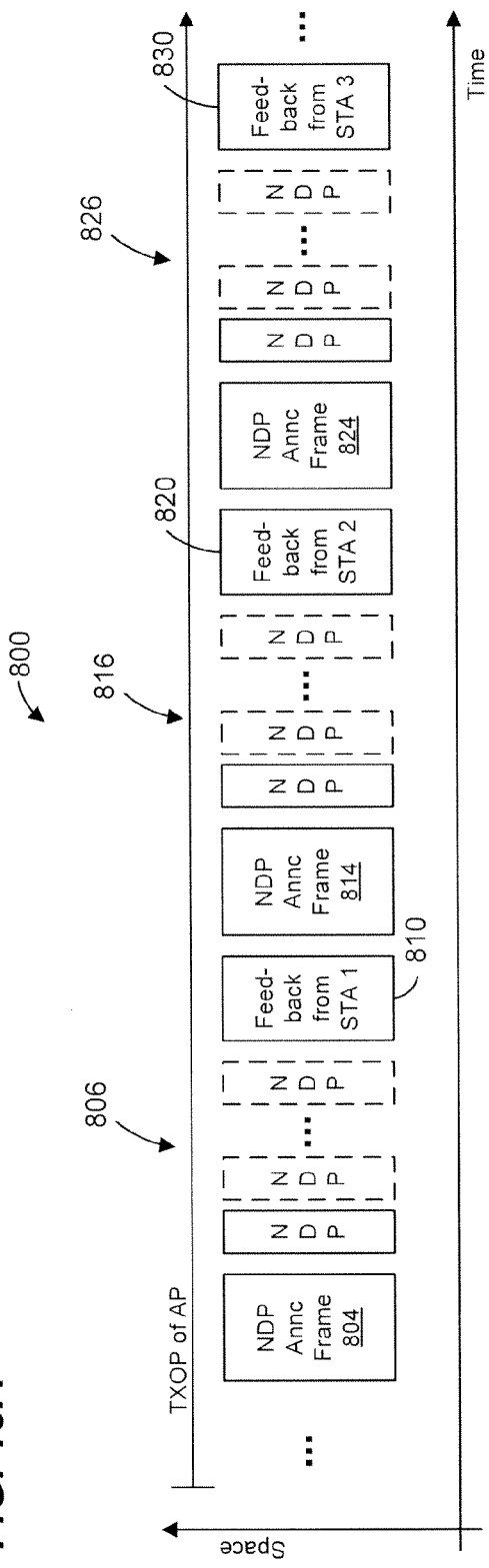
FIGS. 13A and 13B are diagrams of other example transmission sequences in a WLAN, according to some embodiments.

FIG. 13A is a diagram of an example transmission sequence 800 in a WLAN, such as the WLAN 10 of FIG. 1, according to an embodiment. For ease of explanation, FIG. 13A will be described with reference to FIG. 1. In some embodiments, however, the transmission sequence of FIG. 13A is carried out by system different than the system 10 of FIG. 1.

During a TXOP of an AP, the MAC processing unit 18 causes the network interface 16 to transmit an NDP announcement frame 804. The MAC processing unit 18 causes the network interface 16 to transmit one or more NDPs 806 following the NDP announcement frame 804. Each NDP 806 includes a plurality of training fields. In one embodiment, the network interface 16 transmits a training field for each spatial dimension in a MIMO channel, in an embodiment.

The NDP announcement frame 804 includes sounding control information, such as described above, that indicates a client device that is permitted to transmit sounding feedback in response to and/or immediately after the end of the one or more NDPs 806. Thus, the indicated client station transmits sounding feedback 810 during the TXOP of the AP.

For other client devices that should generate and transmit sounding feedback as indicated by the NDP announcement frame, the AP transmits a further NDP announcement frame acting as an SFB request for each client device. Following each NDP announcement frame, the AP transmits one or more NDPs. In response to each NDP announcement frame, a client device client transmits its SFB. For example, the MAC processing unit 18 causes the network interface 16 to transmit an NDP announcement frame 814 and one or more NDPs 816 to a client device STA 2. In response, the client device STA 2 transmits SFB 820. Similarly, the MAC processing unit 18 causes the network interface 16 to transmit an NDP announcement frame 824 and one or more NDPs 826 to a client device STA 3. In response, the client device STA 3 transmits SFB 830. The NDP announcements 804, 814, 824 and the SFB 810, 820, 830 are transmitted during the TXOP of the AP.

In an embodiment, the NDP announcements 814, 824 are simplified with respect to the NDP announcement 804. For example, in an embodiment, the NDP announcements 814, 824 are merely directed at specific client stations.

Figure 13B:
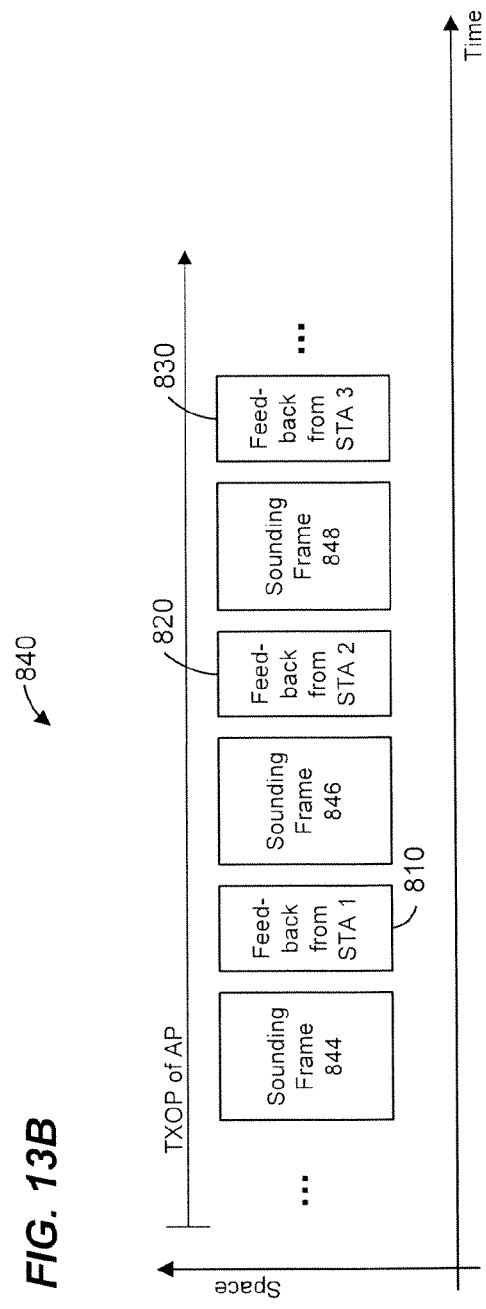

FIG. 13B is a diagram of an example transmission sequence 840 in a WLAN, such as the WLAN 10 of FIG. 1, according to an embodiment. The sequence 840 is the same as the sequence 800 of FIG. 13A, except that the AP transmits sounding frames 844, 846, 848 rather than an NDP announcement frames 804, 814, 824 and one or more NDPs 806, 816, 826.

In an embodiment, the sounding frames 846, 848 are simplified with respect to the NDP announcement 844. For example, in an embodiment, the sounding frames 846, 848 are merely directed at specific client stations. In an embodiment, each sounding frame 846, 848 include a MAC header with a DA set to the address of the specific client device. In other embodiments, each sounding frame 846, 848 is merely a PHY preamble that omits a MAC portion. In one embodiment, the PHY preamble includes an indication of the address of the specific client device. In another embodiment, the PHY preamble omits an indication of the address of the specific client device. In this embodiment, the order of AIDS utilized in the group definition field that defined the group of client devices indicates the order in which client devices should respond to the NDPs 846, 848.

FIG. 14A is a diagram of an example transmission sequence 860 in a WLAN, such as the WLAN 10 of FIG. 1, according to an embodiment. For ease of explanation, FIG. 14A will be described with reference to FIG. 1. In some embodiments, however, the transmission sequence of FIG. 14A is carried out by system different than the system 10 of FIG. 1.

During a TXOP of an AP, the MAC processing unit 18 causes the network interface 16 to transmit an NDP announcement frame 864. The MAC processing unit 18 causes the network interface 16 to transmit one or more NDPs 866 following the NDP announcement frame 864. Each NDP 866 includes a plurality of training fields. In one embodiment, the network interface 16 transmits a training field for each spatial dimension in a MIMO channel, in an embodiment.

In some embodiments, the NDP announcement frame 864 includes sounding control information. The sounding control information is included in one or more of i) a PHY preamble, such as in a signal field, ii) in a MAC header, iii) in a frame body, etc., of one or more of the NDP announcement frame 864 and/or of one or more NDPs 866, in various embodiments. The sounding control information includes information that indicates a client device that is permitted to transmit sounding feedback in response to and/or immediately after the end of the one or more NDPs 866. Thus, the indicated client station transmits SFB 870 during the TXOP of the AP.

For other client devices that should generate and transmit sounding feedback as indicated by the NDP announcement frame, the sounding control information includes scheduling information for the other client devices to transmit SFB, in an embodiment. For example, in an embodiment, the sounding control information includes offset information that indicates when a client device is to transmit the SFB. For instance, the sounding control information includes information that indicates an offset 876 from the last NDP 866 to when the client device STA 2 is to transmit SFB 872. Similarly, the sounding control information includes information that indicates an offset 878 from the last NDP 866 to when the client device STA 3 is to transmit SFB 874.

In an embodiment, the sounding control information includes information that indicates which offset corresponds to which client device. In another embodiment, the sounding control information omits explicit information that indicates which offset corresponds to which client device. Rather, in an embodiment, the offset information is provided in an order that corresponds to an order established by AIDS included in a previously sent group definition field.

FIG. 14B is a diagram of an example transmission sequence 880 in a WLAN, such as the WLAN 10 of FIG. 1, according to an embodiment. The sequence 880 is the same as the sequence 860 of FIG. 14A, except that the AP transmits a sounding frame 884 rather than the NDP announcement frame 864 and one or more NDPs 866.

In embodiments that utilize SFB scheduling with offsets, the offsets may be determined assuming a maximum possible duration of each SFB or an agreed upon or defined SFB duration period.

In one embodiment, each client device knows the maximum possible duration or the agreed upon or defined SFB duration period (referred to for ease of explanation as "the SFB duration period"), and each client device calculates an offset based on an order of AIDs for the group and the SFB duration period. In these embodiments, the sounding control information in the NDP announcement frame or sounding frame 884 need not include offset information.

For example, assuming that a previously sent group definition announcement established a group with AIDS such that client device STA 1 was the first AID, client device STA 2 was the second AID, and client device STA 3 was the third AID in the AID fields, in FIG. 14B, client device STA 2 determines the offset 876 assuming that client device STA 2 is the second client device to transmit SFB and using the known SFB duration period. Similarly, client device STA 3 determines the offset 878 assuming that client device STA 3 is the third client device to transmit SFB and using the known SFB duration period.

In an embodiment, when a client device can complete transmitting the SFB in less time than an assigned or known SFB duration period, the client device pads the SFB frame so that the SFB frame lasts for the SFB duration period. In an embodiment, when a client device cannot complete transmitting the SFB during the assigned or known SFB duration period, the client device transmits a first segment of the SFB during the SFB duration period, using padding if necessary. The SFB frame that includes the first segment of SFB includes an indication that the SFB frame does not include the full SFB. The client device transmits a second segment of the SFB is transmitted at a later time, such as during a TXOP of the client device. In one embodiment, the AP transmits polling request to client stations to prompt the client stations to transmit remaining SFB.

Figure 15A:
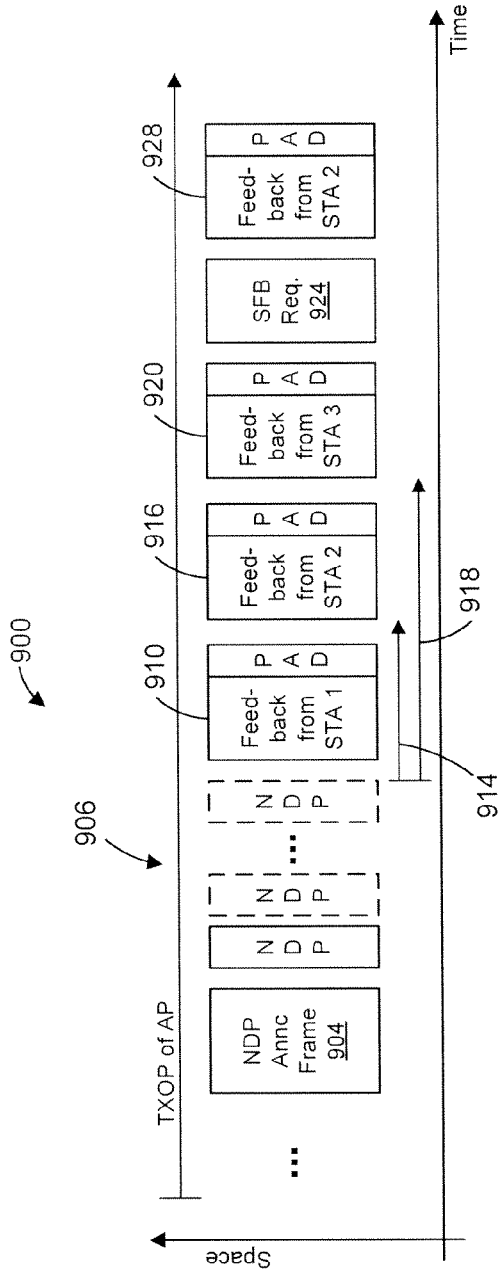
FIGS. 15A and 15B are diagrams of other example transmission sequences in a WLAN, according to some embodiments.

FIG. 15A is a diagram of an example transmission sequence 900 in a WLAN, such as the WLAN 10 of FIG. 1, according to an embodiment. For ease of explanation, FIG. 15A be described with reference to FIG. 1. In some embodiments, however, the transmission sequence of FIG. 15A is carried out by system different than the system 10 of FIG. 1.

During a TXOP of an AP, the MAC processing unit 18 causes the network interface 16 to transmit an NDP announcement frame 904. The MAC processing unit 18 causes the network interface 16 to transmit one or more NDPs 906 following the NDP announcement frame 904. Each NDP 906 includes a plurality of training fields. In one embodiment, the network interface 16 transmits a training field for each spatial dimension in a MIMO channel, in an embodiment.

The NDP announcement frame 904 includes sounding control information, in some embodiments. The sounding control information is included in one or more of i) a PHY preamble, such as in a signal field, ii) in a MAC header, iii) in a frame body, etc., of one or more of the NDP announcement frame 904 and one or more NDPs 906, in various embodiments. The sounding control information includes information that indicates a client device that is permitted to transmit sounding feedback in response to and/or immediately after the end of the one or more NDPs 906. Thus, the indicated client station transmits SFB 910 during the TXOP of the AP.

For other client devices that should generate and transmit sounding feedback as indicated by the NDP announcement frame, the sounding control information includes scheduling information for the other client devices to transmit SFB, in an embodiment. For example, in an embodiment, the sounding control information includes offset information that indicates when a client device is to transmit the SFB. For instance, the sounding control information includes information that indicates an offset 914 from the last NDP 906 to when the client device STA 2 is to transmit SFB 916. Similarly, the sounding control information includes information that indicates an offset 918 from the last NDP 906 to when the client device STA 3 is to transmit SFB 920.

In an embodiment, the sounding control information includes information that indicates which offset corresponds to which client device. In another embodiment, the sounding control information omits explicit information that indicates which offset corresponds to which client device. Rather, in an embodiment, the offset information is provided in an order that corresponds to an order established by AIDs included in a previously sent group definition field.

In embodiments that utilize SFB scheduling with offsets, the offsets may be determined assuming a maximum possible duration of each SFB or an agreed upon or defined SFB duration period.

In one embodiment, each client device knows the maximum possible duration or the agreed upon or defined SFB duration period (referred to for ease of explanation as "the SFB duration period"), and each client device calculates an offset based on an order of AIDS for the group and the SFB duration period. In these embodiments, the sounding control information in the NDP announcement frame or sounding frame 884 need not include offset information.

For example, assuming that a previously sent group definition announcement established a group with AIDs such that client device STA 1 was the first AID, client device STA 2 was the second AID, and client device STA 3 was the third AID in the AID fields, in FIG. 15A, client device STA 2 determines the offset 914 assuming that client device STA 2 is the second client device to transmit SFB and using the known SFB duration period. Similarly, client device STA 3 determines the offset 918 assuming that client device STA 3 is the third client device to transmit SFB and using the known SFB duration period.

In an embodiment, when a client device can complete transmitting the SFB in less time than an assigned or known SFB duration period, the client device pads the SFB frame so that the SFB frame lasts for the SFB duration period. In an embodiment, when a client device cannot complete transmitting the SFB during the assigned or known SFB duration period, the client device transmits a first segment of the SFB during the SFB duration period, using padding if necessary. The SFB frame that includes the first segment of SFB includes an indication that the SFB frame does not include the full SFB.

In the example of FIG. 15A, the client device STA 2 was not able to transmit all SFB in the frame 916. Therefore, the SFB frame 916 includes an indication that the SFB in frame 916 is not complete. In response to the indication that the frame 916 is not complete, the MAC processing unit 18 causes the network interface 16 to transmit an SFB request 924. In response to the SFB request 924, the client device STA 2 transmits the second segment of the SFB in an SFB frame 928.

In one embodiment, the SFB request 924 is included in a data frame. In another embodiment, the SFB request 924 is included in a management frame, such as an NDP, a sounding frame, etc. In one embodiment, the SFB 928 is included in an ACK frame.

Figure 15B:
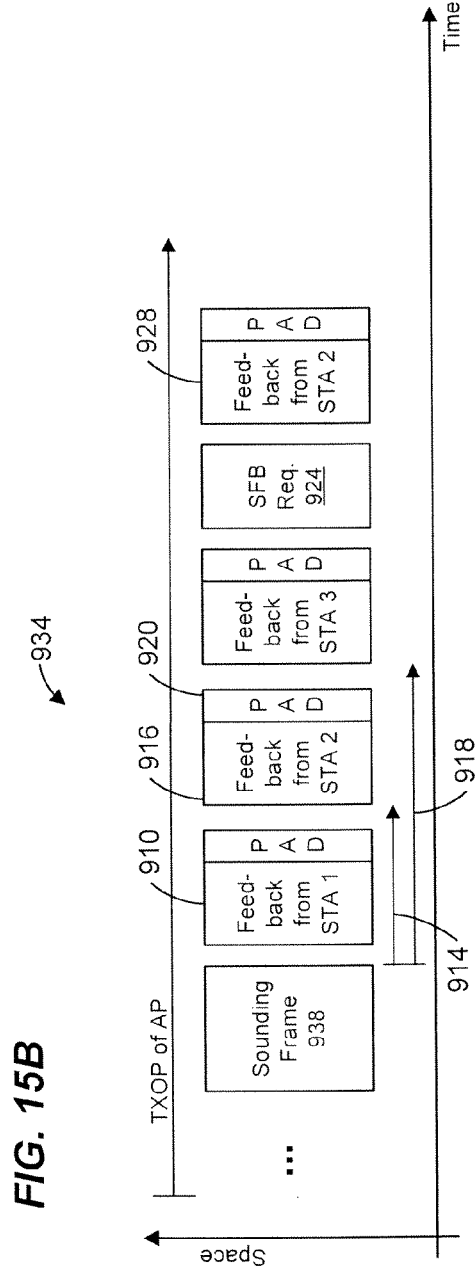

FIG. 15B is a diagram of an example transmission sequence 934 in a WLAN, such as the WLAN 10 of FIG. 1, according to an embodiment. The sequence 934 is the same as the sequence 900 of FIG. 15A, except that the AP transmits a sounding frame 938 rather than the NDP announcement frame 904 and one or more NDPs 906.

In some embodiments, the AP polls client device that have not transmitted full SFB one by one. In one embodiment, the AP transmits a single SFB request to poll multiple stations. For example, in one embodiment, the single SFB request includes a group ID and a bitmap to indicate stations in the group that are to transmit remaining SFB segments. In one embodiment, the single SFB includes scheduling information (e.g., offset information) for client devices to transmit the remaining SFB segments.

In some embodiments, scheduling information includes sequence information that indicates an order in which client devices are to transmit SFB. In one embodiment, a client device determines a time at which to transmit SFB using the sequence information and detecting when prior client devices in the sequence have transmitted their SFB. In another embodiment, a client device determines a time at which to transmit SFB using the sequence information and SFB duration period information.

Figure 16:
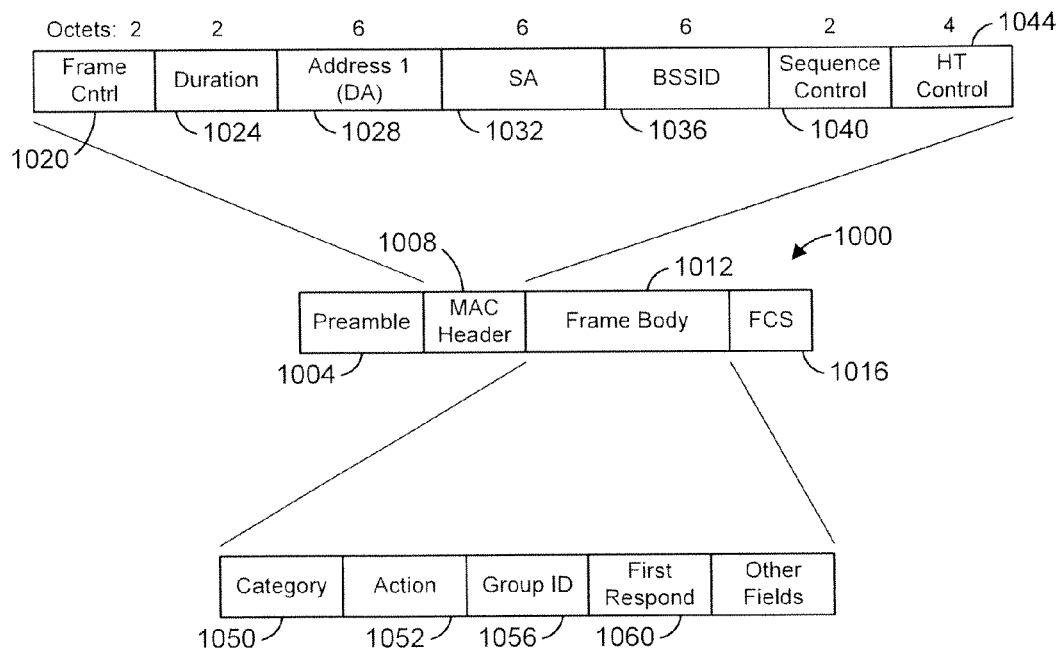
FIG. 16 is a block diagram of an example NDP announcement frame, according to an embodiment.

FIG. 16 is a block diagram of an example NDP announcement frame 1000 that is utilized by the AP to inform client devices that one or more NDPs are to follow and that the client devices are to provide SFB, in some embodiments. For ease of explanation, FIG. 16 will be described with reference to FIG. 1. In some embodiments, however, the example frame 1000 is utilized in a system different than the system 10 of FIG. 1.

The NDP announcement frame 1000 includes a preamble 1004, a MAC header 1008, a frame body 1012, and an FCS 1016. The MAC header 1008 includes a frame control field 1020, a duration field 1024, a DA field 1028, a source address (SA) field 1032, a basic service set identifier (BSSID) 1036, a sequence control field 1040, and a further control field 1044. Although FIG. 16 illustrates example field lengths (in octets), in an embodiment, the fields may have other suitable lengths in other embodiments.

The frame body 1012 includes a category field 1050, an action field 1052, a group ID field 1056, and a first responder field 1060.

When the AP is to perform a sounding process with a group of client devices, the MAC processing unit 18 sets the frame control field to a value indicating a management/action frame. Additionally, MAC processing unit 18 sets the DA 1028 to a value corresponding to a broadcast, and sets the SA to an address of the AP. Also, the MAC processing unit 18 sets the BSSID field 1036 to a value indicating the BSSID of the WLAN. Further, the MAC processing unit 18 sets the control field 1044 to a value indicating the frame is an NDP announcement frame and indicating a type of SFB (e.g., CSI or beamforming coefficients).

Additionally, the MAC processing unit 18 sets the category field 1050 to a value indicating a VHT protocol, and sets the action field 1052 to a value indicating a multi-user (MU) NDP announcement. Further, the MAC processing unit 18 sets the group ID field 1056 to a value indicating the desired group of client devices. Additionally, the MAC processing unit 18 sets the first responder field 1060 to a value indicating one client device in the group of client devices that is to transmit SFB in response to and/or immediately after the last NDP transmitted by the AP. The first responder field 1060 is an example of sounding control information. In another embodiment, the frame body 1012 includes other sounding control information such as discussed above.

Figure 17:
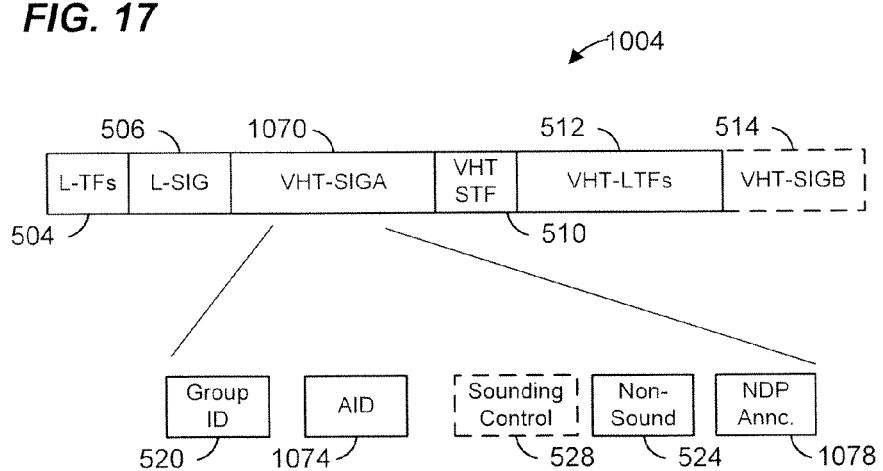
FIG. 17 is a diagram of an example physical layer (PHY) preamble that is utilized in the NDP announcement frame of FIG. 16 or as a sounding frame, according to an embodiment.

In one embodiment, the preamble 1004 has a format the same as or similar to the preamble format set forth in the IEEE 802.11n Standard or another suitable format. In another embodiment, the preamble 1004 has a format such as illustrated in FIG. 17. In this embodiment, the preamble has a format similar to the format discussed with reference to FIG. 9. A signal field VHT-SIGA 1070 includes an AID subfield 1074, in an embodiment. In one embodiment, the MAC processing unit 18 sets the AID subfield 1074 and the group ID subfield 520 to different values depending on the type of sounding to be conducted, in an embodiment. For example, if the sounding is to be to a single client device only, the AID subfield 1074 is set to an AID of the single client device, and the group ID is set to a suitable value such as zero. If the sounding is to be to a group of client devices, the AID subfield 1074 is set to a value indicative of a broadcast, and the group ID subfield 520 is set to a suitable group ID value. Similarly, if the sounding is to be to multiple client devices not limited to a single group, the AID subfield 1074 is set to a value indicative of a broadcast, and the group ID subfield 520 is set to a group ID value indicative of a broadcast, such as 0xF.

In an embodiment, the signal field VHT-SIGA 1070 also includes an NDP announcement subfield 1078. In one embodiment, the MAC processing unit 18 sets the NDP announcement subfield 1078 to a suitable value when the frame is serving as an NDP announcement. When the preamble 1004 includes the NDP announcement subfield 1078, the PHY processing unit 29 of the client device 25 can determine whether the frame serves as and NDP announcement. In another embodiment, the preamble omits the NDP announcement subfield 1078.

In some embodiments, when the preamble includes a group ID field and the MAC header includes a control field such as the control field 1044, frame types other than NDP announcement frames (such as other control/management frames or a data frame) can serve as an NDP announcement frame. For example, if a single client device is to be sounded, a non-NDP announcement frame (such as other control/management frames or a data frame) also serves as an NDP announcement when a subfield of the control field 1044 is set to indicate an NDP announcement. Similarly, if a group of client devices is to be sounded, a non-NDP announcement frame (such as other control/management frames or a data frame) also serves as an NDP announcement when a subfield of the control field 1044 is set to indicate an NDP announcement and the group ID field 520 is set to the appropriate group ID value. In one embodiment, when the preamble includes a group ID field, the group id field 1056 is not necessary in the MAC header. In another embodiment, both the preamble and the MAC header include group ID fields. Similarly, when the preamble includes an NDP announcement subfield (such as in the signal field, the group id field 1056 is not necessary in the MAC header. In another embodiment, both the preamble and the MAC header include group ID fields.

Figure 18:
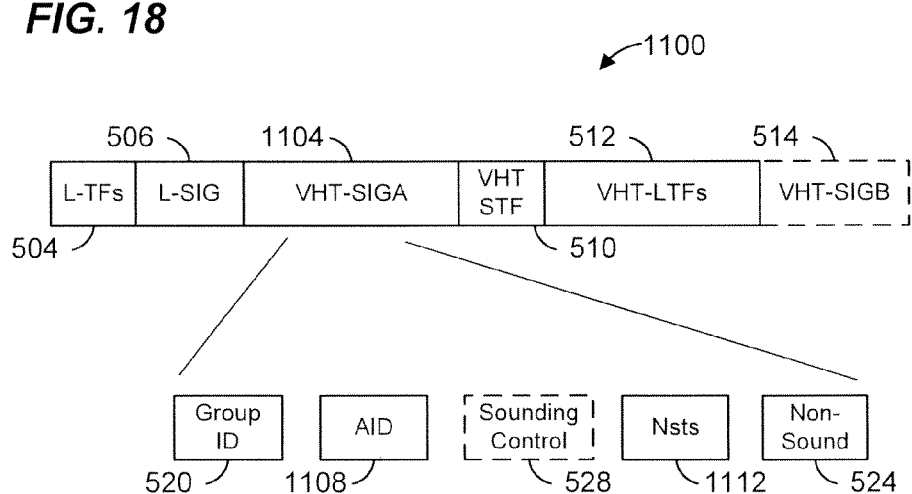
FIG. 18 is a diagram of an example PHY preamble that is, or is utilized in, an NDP, in an embodiment.

FIG. 18 is a diagram of an example PHY preamble 1100 that is or is utilized in an NDP, in an embodiment. The PHY preamble 1100 is similar to the PHY preamble 500 of FIG. 9, but a signal field VHT-SIGA 1104 includes an AID subfield 1108 to permit sounding to single station, when desired and/or appropriate. In an embodiment, the preamble 1100 also includes a number of spatial streams (Nsts) field 1112 to indicate a number of antennas being sounded.

In an embodiment, when a single client device is being sounded, the MAC processing unit 18 causes the group ID field 520 to be set to a suitable value such as zero, and causes the AID field 1108 to he set to an AID of the client device to be sounded. On the other hand, when multiple client device are being sounded, the MAC processing unit 18 causes the group ID field 520 to be set to a group ID or broadcast value, and causes the AID field 1108 to be set to a value indicative of a broadcast.

Figure 19:
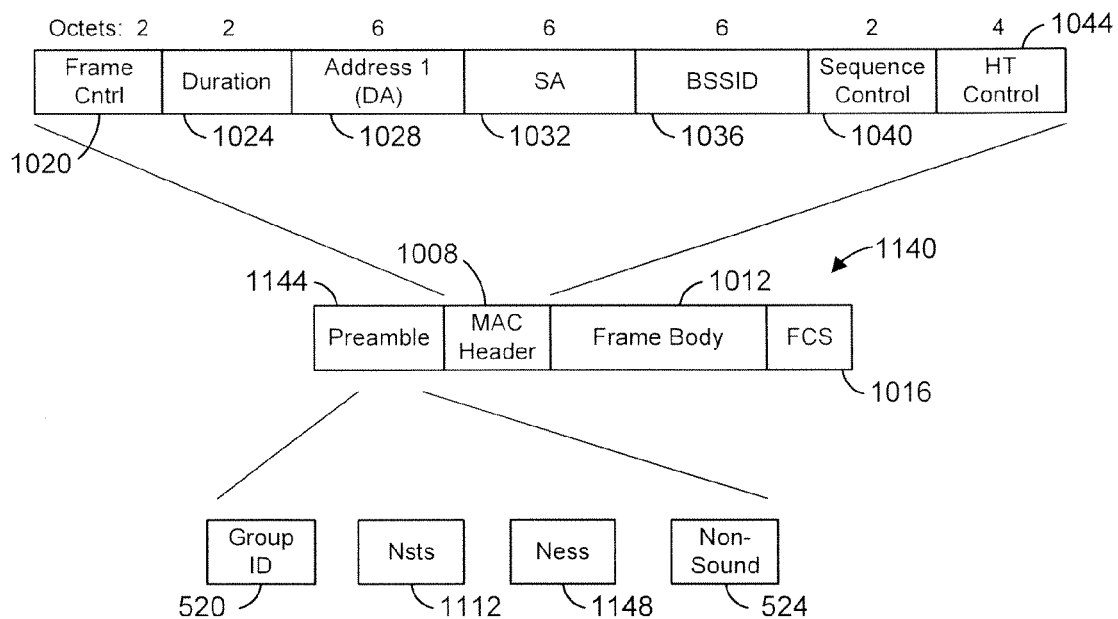
FIG. 19 is a diagram of an example frame that is utilized as a sounding frame, in an embodiment.

FIG. 19 is a diagram of an example frame 1140 that is utilized as a sounding frame that includes data transmitted using a first number of spatial stream but sounds a second number of spatial streams larger than the first number (referred sometimes as "staggered sounding"), in an embodiment. The frame 1140 is similar to the frame 1000 of FIG. 16. A PHY preamble 1144 includes the Nsts subfield 1112 and a number of extension spatial streams (Ness) to indicate a number of antennas being sounded.

In an embodiment, when a single client device is being sounded, the MAC processing unit 18 causes the group ID field 520 to be set to a suitable value such as zero. Additionally, the MAC processing unit 18 sets the DA 1028 to the address of the client device to be sounded and sets the SA address 1032 to the address of the AP. Additionally, the MAC processing unit 18 sets as subfield of the control field 1044 to a value to indicate the type of SFB to be provided (e.g., CSI or beamforming coefficients).

On the other hand, when multiple client device are being sounded, the MAC processing unit 18 causes the group ID field 520 to be set to a group ID or broadcast value, and sets the DA field 1028 to a value indicative of a broadcast. In another embodiment in which a group ID subfield is included in the control field 1044 and/or the frame body 1012, the group ID field 520 is set to zero and the group ID subfield in the control field 1044 and/or the frame body 1012 is set to a group ID or broadcast value when multiple client device are being sounded.

Figure 20:
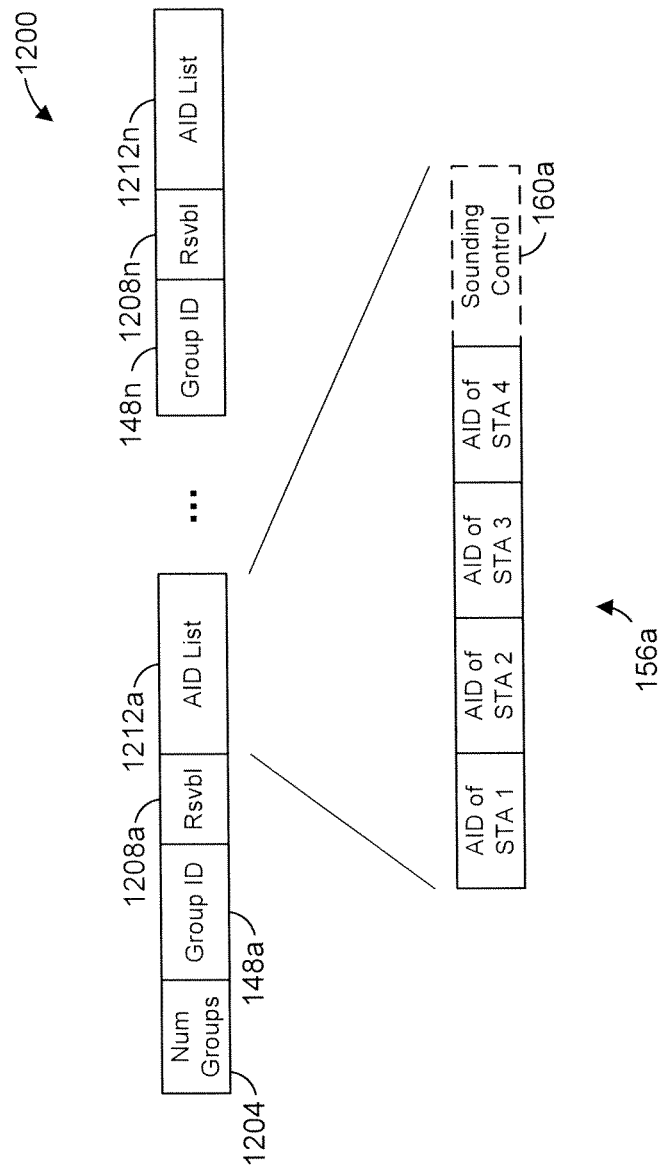
FIG. 20 is a diagram of an example group definition field, according to an embodiment.

FIG. 20 is a diagram of an example group definition field 1200, according to an embodiment, similar to the group definition field 130 discussed with respect to FIGS. 2 and 3. The group definition field 1200 permits defining multiple groups. The group definition field 1200 includes a number of groups field 1204 to indicate a number of groups to be defined. For each group to be defined, the group definition field 1200 includes the group ID field 148, a field 1208 to indicate whether training fields corresponding to the group are resolvable, and an AID list field 1212. The AID list field 1212 includes the AID fields 156. In some embodiments, the AID list field 1212 includes sounding control information 160. In one embodiment, each AID list field 1212 includes four AID fields 156. In this embodiment, if the group has less than four client devices, the remaining AID fields 156 are filled with zeros or some other suitable value.

In an embodiment, if the field 1200 is included in a frame with an NDP announcement field set to indicate an NDP announcement, the frame serves as an NDP announcement rather than serving a group definition function.

Figure 21:
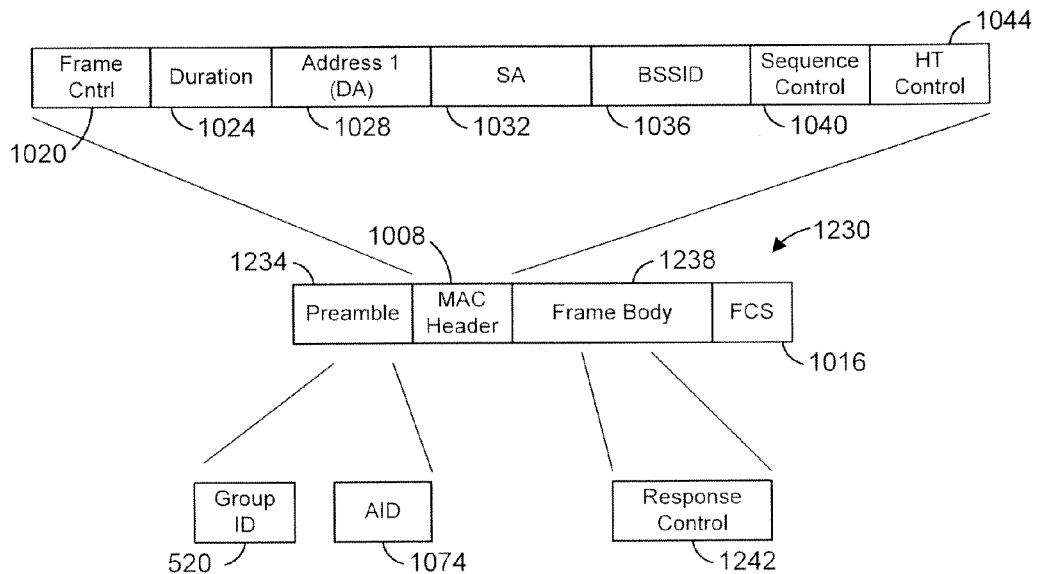
FIG. 21 is a diagram of an example frame that is utilized for polling client devices for SFB, in an embodiment.

FIG. 21 is a diagram of an example frame 1230 that is utilized for polling client devices for SFB, in an embodiment and in some scenarios. The frame 1230 includes a preamble 1234, the MAC header 1008, a frame body 1238, and the FCS 1016. The frame body 1238 includes response control information 1242.

In one embodiment, when the AP is to poll a client device for SFB, the MAC processing unit 18 causes the group ID field 520 to be set to zero or another suitable value, and sets the AID field 1074 to the AID of the client device. Additionally, the MAC processing unit 18 sets the DA 1028 to the address of the client device to be sounded and sets the SA address 1032 to the address of the AP. Further, the MAC processing unit 18 sets the frame control field to a suitable value such as a value indicating a management-action, ACK, or management-action, no ACK. In one embodiment, the MAC processing unit 18 sets the response control information 1242 to a value indicating a request for SFB.

In one embodiment, the frame 1230 is utilized to request other types of responses. For example, the frame 1230 is utilized to request an ACK for other types of control/management frames or data frames. In one embodiment, a BAR frame is modified similar to the frame 1230 to permit the BAR frame to poll client devices for SFB, in an embodiment and in some scenarios.

Figure 22:
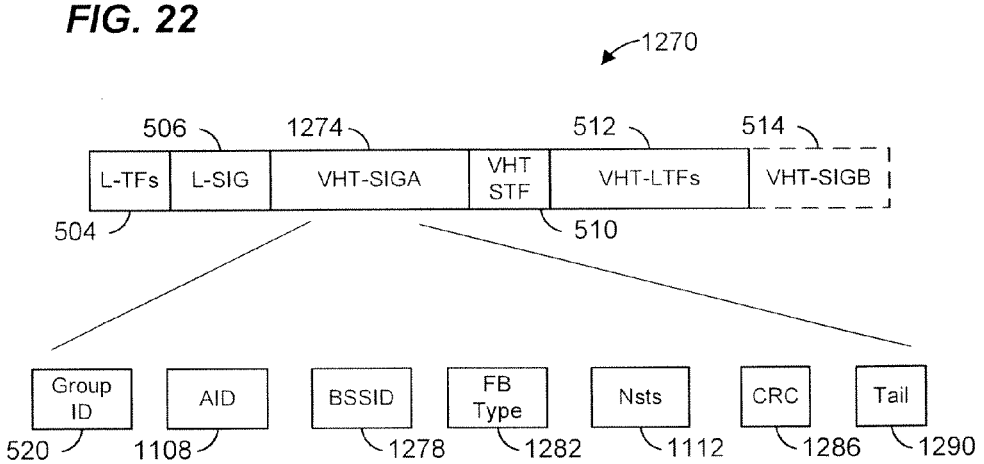
FIG. 22 is a diagram of an example PHY preamble that is, or is utilized in, an NDP, in an embodiment.

FIG. 22 is a diagram of an example PHY preamble 1270 that is or is utilized in an NDP, in an embodiment. The PHY preamble 1270 is generally similar to the PHY preamble 1100 of FIG. 18, but a signal field VHT-SIGA 1274 includes a BSSID field 1278, a feedback type field 1282, a cyclic redundancy check (CRC) field 1286, and tail bits 1290. In an embodiment, the feedback type field 1282 is set to different values depending on the type of SFB requested, such as CSI, non compressed beamforming coefficients, compressed beamforming coefficients, etc.

In an embodiment, when a single client device is being sounded, the MAC processing unit 18 causes the group ID field 520 to be set to a suitable value such as zero, and causes the AID field 1108 to be set to an AID of the client device to be sounded. On the other hand, when multiple client device are being sounded, the MAC processing unit 18 causes the group ID field 520 to be set to a group ID or broadcast value, and causes the AID field 1108 to be set to a value indicative of a broadcast.

In other embodiments, some or all of the signal field 1274 information discussed with respect to FIG. 22 are included in a MAC header and/or a frame body.

Figure 23A:
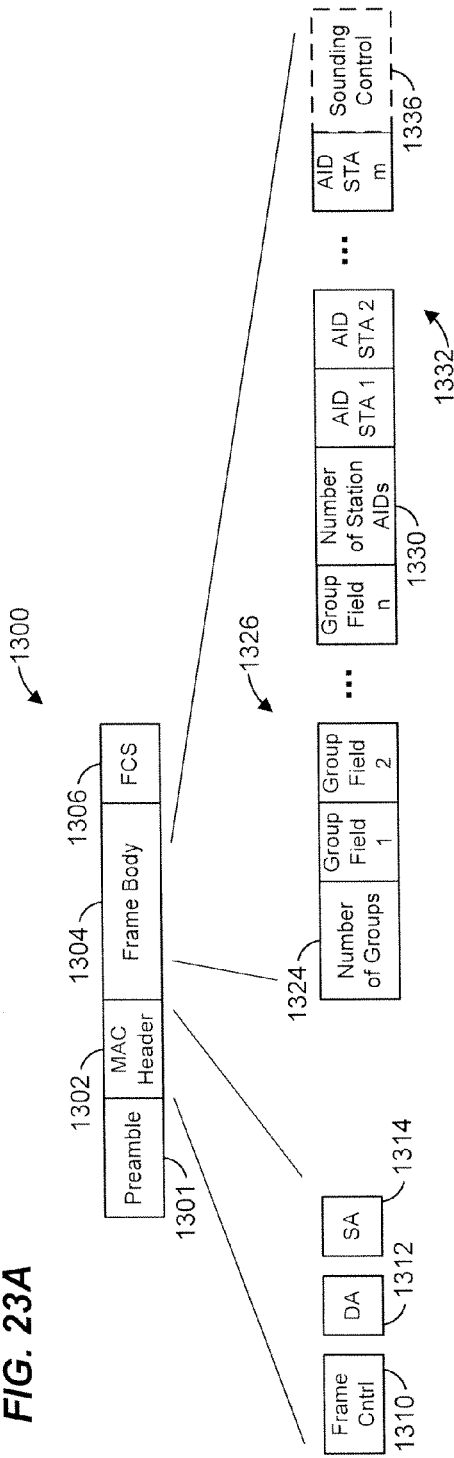
FIGS. 23A and 23B are diagrams of example NDP announcement frames, according to some embodiments.

FIG. 23A is a diagram of an example NDP announcement frame 1300, according to another embodiment. The frame 1300 includes a preamble 1301, a MAC header 1302, a frame body 1304, and an FCS 1306. The MAC header includes a frame control field 1310, a DA field 1312, and an SA field 1314.

The frame body 1304 includes a sounding announcement field 1326 including a number of groups field 1324, one or more group fields 1326, a number of stations field 1330, one or more AID fields 1332. In one embodiment, the sounding announcement field 1326 includes sounding control information 1336 such as described above.

When an AP is to sound multiple stations, the MAC processing unit 18 sets the frame control field 1310 to a value indicating the frame is an NDP announcement frame. Additionally, the MAC processing unit 18 sets the DA 1312 to a broadcast value and the SA 1314 to an address of the AP.

Also, the MAC processing unit 18 sets the field 1324 to a value indicating a number of groups to be sounded. In one embodiment, each group field 1326 includes a group ID of a group to be sounded. In one embodiment, each group field 1326 also includes sounding control information corresponding to the group, such as an indication of particular stations in the group that are to generate and transmit SFB.

The MAC processing unit 18 sets the field 1330 to a value indicating a number of individual client devices to be sounded in addition to the groups corresponding to the fields 1326. In one embodiment, each AID field 1332 includes an AID of a client station to be sounded. In one embodiment, each AID field 1332 also includes sounding control information corresponding to the client device, such as an indication of whether the SFB is to transmit SFB as immediate feedback or if the client device should wait until polled, or if the client device should wait until an TXOP of the client device, the type of SFB, etc.

In one embodiment, the sounding control information 1336 includes an indication of a client device that is to transmit SFB first and in response to an end of the NDP(s) of the AP. In one embodiment, if the indication is set to zero or another suitable value, this indicates that no client device is to transmit SFB in response to and/or immediately after the end of the NDP(s) of the AP. Rather, all client devices are to transmit SFB according to a schedule, in response to a subsequent poll/request from the AP, in a TXOP of the client device, etc.

In one embodiment, a control frame sub-type extension field (not shown) is utilized, in addition to the frame control field 1310, and set to a value to indicate the frame is an NDP announcement frame. In one embodiment, the control frame sub-type extension field is included in the MAC header 1302. In another embodiment, the control frame sub-type extension field is included in the frame body 1304.

Figure 23B:
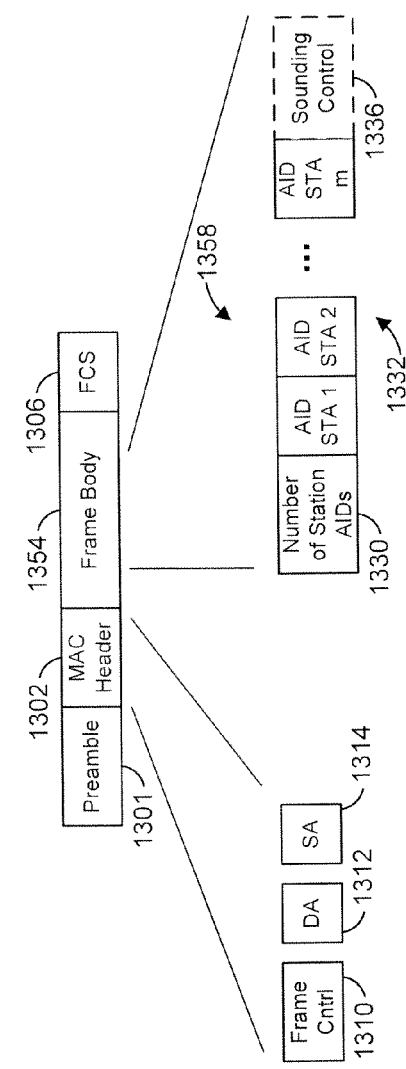

FIG. 23B is a diagram of another example NDP announcement frame 1350, according to another embodiment. The frame 1350 is similar to the frame 1300 of FIG. 23A, but, in an embodiment, a frame body 1354 includes a sounding announcement field 1358 that omits the number of groups field 1324 and the one or more group fields 1326. In this embodiment, an AP simply indicates all STAs that need to process the NDP(s) and transmit sounding feedbacks using the number of stations field 1330, the one or more AID fields 1332, and the sounding control information 1336 (if included). In this embodiment, the AP does not utilize group information (e.g., group ID) for announcing sounding to multiple stations. In an embodiment, the first AID in the list 1332 indicates the client station that is expected to send sounding feedback in response to and/or immediately after the last NDP. In another embodiment, none of the client stations is expected to send sounding feedback in response to and/or immediately after the last NDP. Rather, each client station is polled by the AP for SFB.

Figure 24:
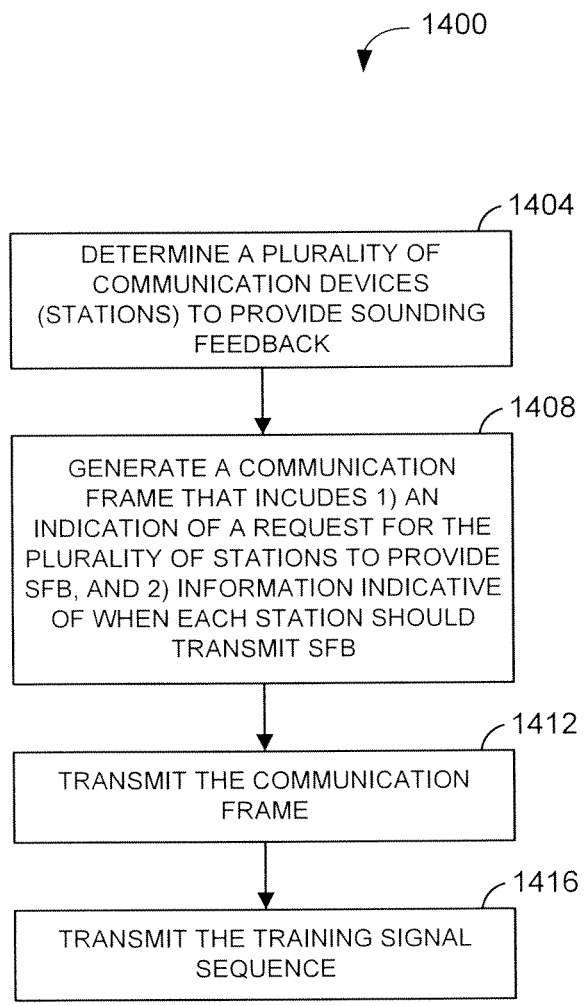
FIG. 24 is a flow diagram of an example method for generating and transmitting a communication frame related to requesting sounding feedback from a plurality of stations, in an embodiment.

FIG. 24 is a flow diagram of an example method 1400 for generating and transmitting a communication frame related to requesting sounding feedback from a plurality of stations, in an embodiment. The method 1400 is implemented by a network interface such as the network interface 16 of FIG. 1, in an embodiment. In other embodiments, the method 1400 is implemented by another suitable communication device.

At block 1404, a plurality of communication devices (stations) to provide sounding feedback (SFB) in response to a training signal sequence is determined. As discussed above, in various embodiments, the plurality of stations comprises one or more of i) a defined group of stations with an associated group ID, ii) a subset of stations in the defined group of stations, iii) a plurality of defined groups of stations with respective associated group IDs, iv) a subset of stations in the defined groups of stations, v) a plurality of individual stations, etc. In one embodiment, the MAC processing unit 18 implements block 1404.

At block 1408, a communication frame is generated to include i) an indication of the plurality of stations determined at block 1404, and ii) information indicative of when each station in the plurality of stations should transmit SFB. As discussed above, in various embodiments, the indication of the plurality of stations comprises one or more of i) one or more group IDs, ii) one or more bitmaps and/or station identifiers (e.g., AIDs) or other suitable information corresponding to the one or more group IDs to indicate a subset of stations in each group of stations, v) a plurality of station identifiers, etc. In one embodiment, the MAC processing unit 18 and the PHY processing unit 20 implement block 1408. For example, the MAC processing unit 18 populates fields in a MAC header and/or frame body, and/or causes the PHY processing unit 20 to populate fields in a PHY preamble. As discussed above, in various embodiments, the communication frame corresponds to i) a group definition function, ii) an NDP announcement function, iii) a sounding frame, etc.

At block 1412, the communication frame generated at block 1408 is transmitted. In one embodiment, the MAC processing unit 18 and the PHY processing unit 20 implement block 1412. For example, the MAC processing unit 18 causes the PHY processing unit 20 to transmit the communication frame.

At block 1416, the training signal sequence is transmitted. For example, in some embodiments, the training signal sequence is included in one or more NDPs transmitted after the communication frame generated at block 1408. As another example, in some embodiments, the training signal sequence is included in the communication frame generated at block 1408. In these embodiments, block 1416 is an element of block 1412. In one embodiment, the MAC processing unit 18 and the PHY processing unit 20 implement block 1416. For example, the MAC processing unit 18 causes the PHY processing unit 20 to transmit the training signal sequence.

In some embodiments, the method 1400 is implemented by a client device such as the client device 25-1 of FIG. 1. For instance, a client device requests SFB from a plurality of other client devices, or the AP and one or more client devices. In an embodiment, the method 1400 is implemented by the network interface 27 in a similar manner as discussed above with respect to the network interface 16. In embodiments in which a client requests SFB from the AP and in which AIDS are utilized, the AP is assigned a suitable AID value such as zero. In embodiments in which a client requests SFB from all client stations in the BSSID or all client stations in a group and in which AIDS are utilized, a suitable AID value such as 0xFF is utilized for a broadcast value. In an embodiment in which valid AIDs range from 1-2007, one or more AID values may be utilized for purposes other than addressing a client device, such as addressing the AP, designating a broadcast, etc. Other examples of special AID values, in embodiments in which valid AIDs range from 1-2007, include 0b11xxxxx111111111, 2008, 0b11xxx111111111111, 0b01xxxxxxxxxxxxxx, 0b101xxxxxxxxxxxxxx, 0b00xxxxxxxxxxxxxx, etc., where x can be one or zero. If a special AID in a signal field of a preamble is not sufficient to uniquely identify the AP or broadcast, a bit in the signal field or in another signal field (e.g., VHT-SIGB) is utilized to indicate an uplink sounding or broadcast, in an embodiment.

Figure 25:
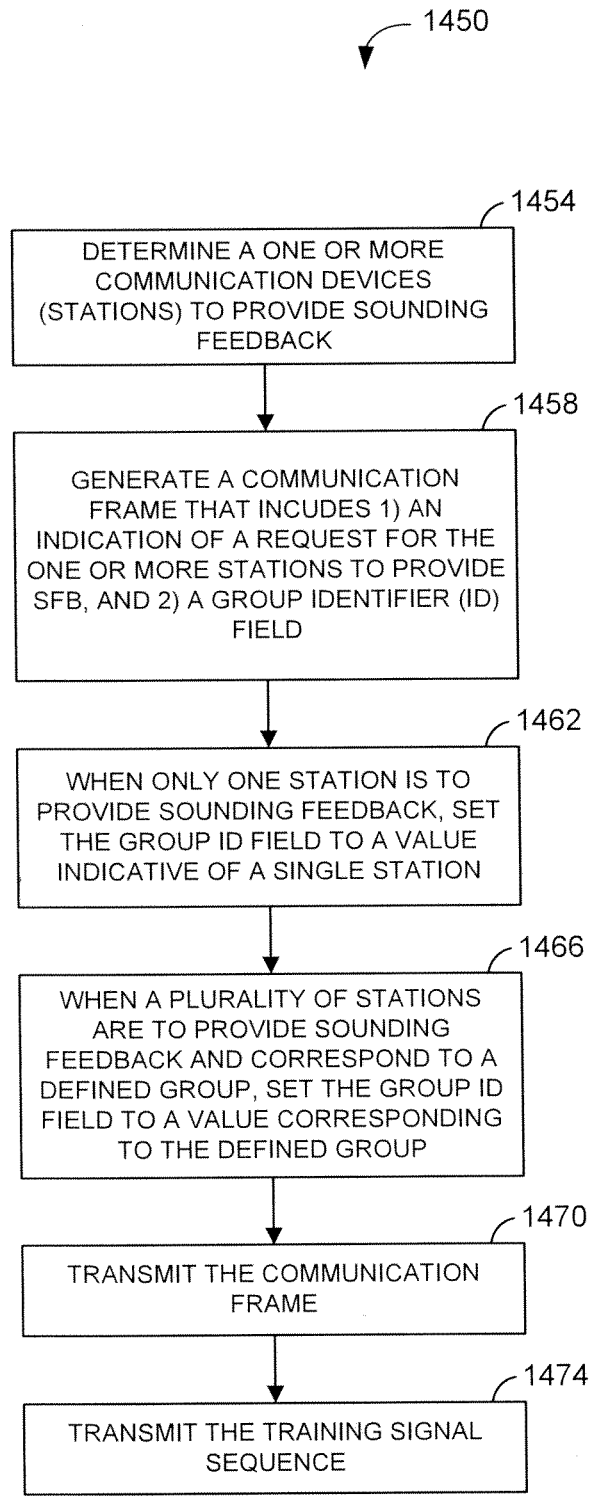
FIG. 25 is a flow diagram of an example method for generating and transmitting a communication frame related to requesting sounding feedback from one or more stations, in an embodiment.

FIG. 25 is a flow diagram of an example method 1450 for generating and transmitting a communication frame related to requesting sounding feedback from one or more stations, in an embodiment. The method 1450 is implemented by a network interface such as the network interface 16 of FIG. 1, in an embodiment. In other embodiments, the method 1450 is implemented by another suitable communication device.

At block 1454, one or more communication devices (stations) to provide sounding feedback (SFB) in response to a training signal sequence are determined. As discussed above, in various embodiments, the one or more stations comprises one or more of i) a single station, ii) a defined group of stations with an associated group ID, iii) a subset of stations in the defined group of stations, iv) a plurality of defined groups of stations with respective associated group IDs, v) a subset of stations in the defined groups of stations, vi) a plurality of individual stations, etc. In one embodiment, the MAC processing unit 18 implements block 1454.

At block 1458, a communication frame is generated to include i) an indication of the one or more stations determined at block 1454, and ii) a group identifier (ID) field. As discussed above, an AP may define a group of stations and assign the group of stations a group ID. Such a group ID can be specified in the group ID field. On the other hand, in some embodiments, the group ID field can be set to one or more values that do not correspond to a defined group. For example, a group ID field set to zero or another suitable value may indicate a single station is to be sounded or a plurality of individual stations not corresponding to a single group ID, not yet assigned to a group, etc., are to be sounded.

At block 1462, when only one station is to provide SFB, the group ID field is set to a value (e.g., zero or another suitable value) indicative of a single station. The value need not be determinative that only a single station is to provide SFB. For example, the group ID value indicative of a single station may be indicative of other scenarios as well such as a plurality of individual stations, a broadcast, etc. Thus, in some embodiments, further information besides the group ID is needed to determine if only a single station is to provide SFB. For example, the group in combination with other information such as a number of stations field, a number of AID fields, a destination address, etc. may definitively indicate whether only one station is to be sounded.

At block 1466, when a plurality of stations in a defined group of stations is to provide SFB, the group ID field is set to the group ID corresponding to the plurality of stations.

In one embodiment, the MAC processing unit 18 and/or the PHY processing unit 20 implement blocks 1452, 1462, and 1466. For example, the MAC processing unit 18 populates fields in a MAC header and/or frame body, and/or causes the PHY processing unit 20 to populate fields in a PHY preamble.

At block 1470, the communication frame generated at block 1458 is transmitted. In one embodiment, the MAC processing unit 18 and the PHY processing unit 20 implement block 1470. For example, the MAC processing unit 18 causes the PHY processing unit 20 to transmit e communication frame.

At block 1474, the training signal sequence is transmitted. For example, in some embodiments, the training signal sequence is included in one or more NDPs transmitted after the communication frame generated at block 1408. As another example, in some embodiments, the training signal sequence is included in the communication frame generated at block 1408. In these embodiments, block 1416 is an element of block 1412. In one embodiment, the MAC processing unit 18 and the PHY processing unit 20 implement block 1416. For example, the MAC processing unit 18 causes the PHY processing unit 20 to the training signal sequence.

In some embodiments, the method 1450 is implemented by a client device such as the client device 25-1 of FIG. 1. For instance, a client device requests SFB from one or more other client devices, the AP, or the AP and one or more client devices. In an embodiment, the method 1450 is implemented by the network interface 27 in a similar manner as discussed above with respect to the network interface 16.

Figure 26:
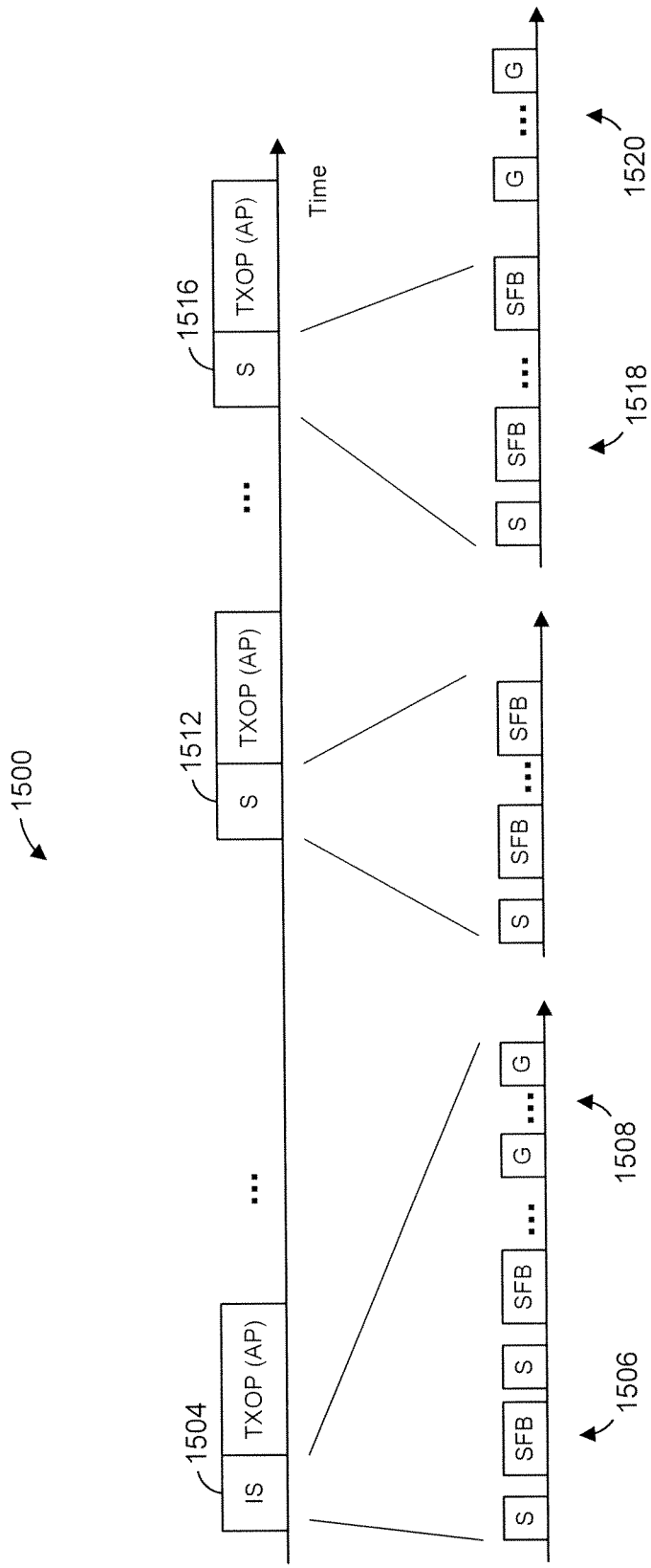
FIG. 26 is a diagram of another example transmission sequence in a WLAN, according to an embodiment.

FIG. 26 is a diagram of an example transmission sequence in a WLAN, such as the WLAN 10 of FIG. 1, according to an embodiment. For ease of explanation, FIG. 26 will be described with reference to FIG. 1. In some embodiments, however, the transmission sequence of FIG. 26 is carried out by system different than the system 10 of FIG. 1.

When an AP has not yet assigned client devices to groups, the AP performs an initial sounding process 1504. During the initial sounding process 1504, the AP transmits sounding frames (e.g., NDPs) to the client devices and receives SFB from the client devices (period 1506). After receiving the SFB and based on the SFB, the AP assigns client devices to groups with corresponding group IDs. The AP also transmits one or more group definition frames to the client devices (period 1508).

Subsequently, the AP performs a sounding update 1512 with the client devices. In particular, the AP sends sounding frames (e.g., NDPs) to the client devices and receives SFB from the client devices. Similarly, the AP performs a sounding update 1516 with the client devices. In particular, the AP sends sounding frames (e.g., NDPs) to the client devices and receives SFB from the client devices during period 1518. Based on the SFB received during the period 1518, the AP updates group assignments and transmits one or more group definition frames to the client devices (period 1520) to reflect the updated group assignments.

In scenarios in which an AP or a client device wishes to generally receive SFB from devices new to the WLAN and/or devices who have experienced channel/signal degradation, the AP/client device sends a "universal sounding frame" in an embodiment. When a communication device receives a universal sounding frame and if the communication device is new to the WLAN or has detected channel/signal degradation, the device responds with SFB. A universal sounding frame is a group definition frame with a group ID set to zero and a number of AIDs field set to zero, in an embodiment. In another embodiment, a universal sounding frame is any broadcast frame with a sounding preamble. In another embodiment, a universal sounding frame is a frame with a sounding preamble and without a MAC portion. In other embodiments, a universal sounding frame is a single user unicast frame with a sounding preamble and a universal sounding flag in a signal field of the preamble or in a MAC header or in a frame body.

When an AP determines a schedule for client devices to provide SFB and/or when determining which client device is to provide SFB in response to the end of the last NDP or sounding frame, the AP utilizes device capability information received from client devices and/or observed information regarding the capabilities of client devices. For example, if a client device indicates to the AP that it is unable to provide immediate SFB and/or if the AP observes that a client device provides SFB after a delay, the AP utilizes this information to schedule SFB. For example, the AP may attempt to avoid having client devices that are slow to respond or have indicated lesser capabilities scheduled to provide SFB shortly after the end of the least NDP or may choose to poll such client devices to retrieve their SFB.

Figure 27:
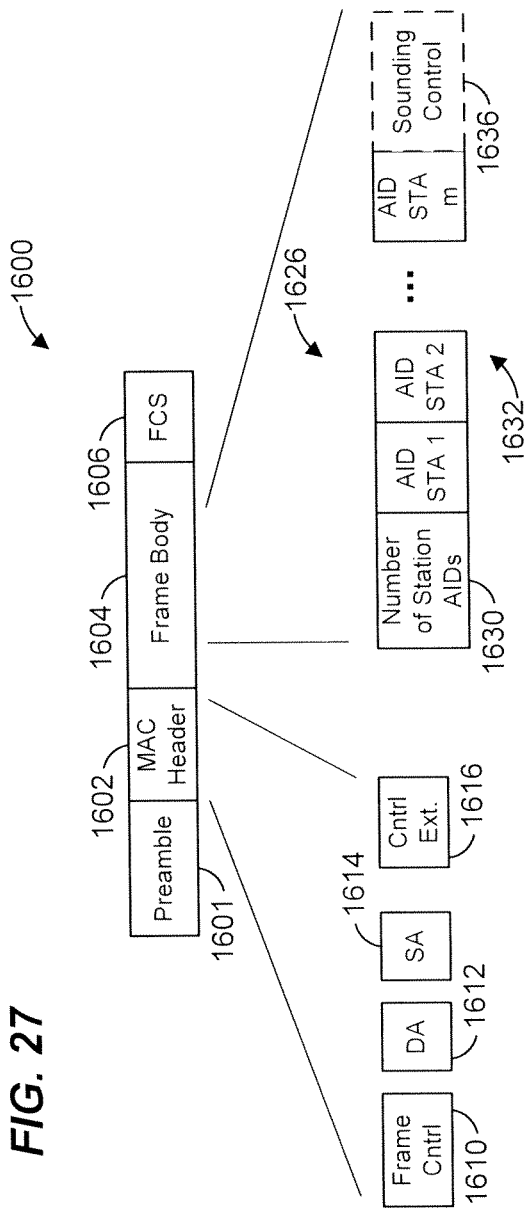
FIG. 27 is a diagram of an example NDP announcement frame, according to an embodiment.

FIG. 27 is a diagram of an example NDP announcement frame 1600, according to another embodiment. The frame 1600 includes a preamble 1601, a MAC header 1602, a frame body 1604, and an FCS 1606. The MAC header 1602 includes a frame control field 1610, a DA field 1612, an SA field 1614, and a control frame sub-type extension field 1616. In another embodiment, the control frame sub-type extension field 1616 is included in the frame body 1604.

The frame body 1604 includes a sounding announcement field 1626 including a number of stations field 1630 and one or more AID fields 1632. In one embodiment, the sounding announcement field 1626 includes sounding control information 1636 such as described above. In the embodiment of FIG. 27, the sounding announcement field 1626 omits a group ID field and a number of groups field.

When an AP is to sound multiple stations, the MAC processing unit 18 sets a portion of the control frame sub-type extension field 1616 to a value indicating the frame is an NDP announcement frame. Additionally, the MAC processing unit 18 sets a portion of the control frame sub-type extension field 1616 to indicate whether stations are to provide SFB in the TXOP of the AP (i.e., immediate feedback) or to indicate that the AP will poll the stations for SFB. Additionally, the MAC processing unit 18 sets the DA 1612 to a broadcast value or a multicast value and the SA 1614 to an address of the AP.

When the AP is to sound a single station, the MAC processing unit 18 sets a portion of the control frame sub-type extension field 1616 to a value indicating the frame is an NDP announcement frame. Additionally, the MAC processing unit 18 sets a portion of the control frame sub-type extension field 1616 to indicate whether the station is to provide SFB in the TXOP of the AP (i.e., immediate feedback) or to indicate that the AP will poll the station for SFB. Additionally, the MAC processing unit 18 sets the DA 1612 to a unicast value, a broadcast value, or a multicast value and the SA 1614 to an address of the AP.

In one embodiment, when the AP is to sound a single station, the MAC processing unit 18 omits the sounding announcement field 1626. In this embodiment, the MAC processing unit 18 sets the DA to the address of the station to be sounded.

The MAC processing unit 18 sets the field 1630 to a value indicating a number of individual client devices to be sounded. In one embodiment, each AID field 1632 includes an AID of a client station to be sounded. In one embodiment, each AID field 1632 also includes sounding control information corresponding to the client device, such as an indication of whether the SFB is to transmit SFB as immediate feedback or if the client device should wait until polled, or if the client device should wait until a TXOP of the client device, the type of SFB, etc. In this embodiment, the control frame sub-type extension field 1616 is not utilized to indicate sounding control information included in the AID fields 1632.

In one embodiment, the first AID field in the AID fields 1632 indicates the station that is to transmit SFS responsive to and/or immediately after the end of the NDP announcement frame 1600. In an embodiment, the MAC processing unit 18 selects the station indicated by the first AID field 1632 from stations that are capable of transmitting SFB immediately after the end of the NDP announcement frame 1600.

In one embodiment, the remaining AID fields 1632 (i.e., AID fields 1632 after the first AID field) are set so that AIDS appear in ascending order. In another embodiment, the remaining AID fields 1632 are not necessarily set so that AIDs appear in ascending order. For example, the MAC processing unit 18 uses station capability information (e.g., whether a station is capable of transmitting SFB immediately after the end of the NDP announcement frame 1600) to determine the order of AIDS. In another embodiment, all of the AID fields 1632, including the first AID field, are set so that AIDs appear in ascending order.

In an embodiment that utilizes the NDP announcement frame 1600, when an AP is to sound all client stations in the basic service set (BSS), the MAC processing unit 18 sets the AID fields 1632 to include AIDs of all of the client stations in the BSS. In another embodiment that utilizes the NDP announcement frame 1600, when an AP is to sound all client stations in the BSS, the MAC processing unit 18 sets a single AID field 1632 to a broadcast AID value. Additionally, the AP polls all client stations in the BSS to obtain SFB. In another embodiment that utilizes the NDP announcement frame 1600, when an AP is to sound all client stations in the BSS, the MAC processing unit 18 sets a first AID field 1632 to an AID of a first AID of a first client station to send immediate SFB, and sets a second AID field 1632 to a broadcast AID value. Additionally, the AP polls all client stations in the BSS, except the first client station, to obtain SFB. In another embodiment that utilizes the NDP announcement frame 1600, when an AP is to sound all client stations in the BSS, the MAC processing unit 18 sets the DA 1612 to a broadcast value, and sets the number of stations field 1630 to zero. Additionally, the AP polls all client stations in the BSS to obtain SFB. In another embodiment that utilizes an NDP announcement frame similar to the NDP announcement frame 1600, when an AP is to sound all client stations in the BSS, the MAC processing unit 18 sets a bit in an NDP announcement control field (not shown) that indicates a broadcast. In an embodiment, the NDP announcement control field (not shown) is included in the sounding announcement field 1626. In another embodiment, the NDP announcement control field (not shown) is included in the MAC header 1602, such as in the control frame sub-type extension field 1616. The NDP announcement control field (not shown) includes other information such as SFB parameters, in an embodiment.

In some embodiments, a non-AP communication device (e.g., a client station) can utilize the NDP announcement frame 1600 to perform sounding with the AP and/or with one or more other client stations. In some embodiments, a non-AP communication device is not permitted to perform sounding with more than one other communication device at a time. In these embodiments, the MAC processing unit 28 sets a portion of the control frame sub-type extension field 1616 to a value indicating the frame is an NDP announcement frame. In an embodiment, the MAC processing unit 28 sets a portion of the control frame sub-type extension field 1616 to indicate whether the other communication device is to provide SFB in the TXOP of the client station (i.e., immediate feedback) or to indicate that the client station will poll the other communication device for SFB. Additionally, the MAC processing unit 28 sets the DA 1612 to a unicast value of the other communication device and the SA 1614 to an address of the client station.

In one embodiment, when the client is to sound a single other communication device, the MAC processing unit 28 omits the sounding announcement field 1626. In this embodiment, the MAC processing unit 28 sets the DA to the address of the station to be sounded.

In another embodiment, when the client is to sound a single other client station, the MAC processing unit 28 sets the number of stations subfield 1630 to one and includes the AID of the other client station in the AID subfield 1632 to the AID of the client station to be sounded. In this embodiment, when the client is to sound the AP, the MAC processing unit 28 sets the number of stations subfield 1630 to one and includes an sets the AID subfield 1632 to an AID value indicative of the AP.

In another embodiment and similar to the above, when the client is to sound a single other client station, the MAC processing unit 28 sets the number of stations subfield 1630 to one and includes the AID of the other client station in the AID subfield 1632 to the AID of the client station to be sounded. In this embodiment, however, when the client is to sound the AP, the MAC processing unit 28 sets the number of stations subfield 1630 to zero and omits an AID subfield 1632 to indicate sounding to the AP.

In another embodiment that utilizes an NDP announcement frame similar to the NDP announcement frame 1600, when a client station is to sound the AP, the MAC processing unit 28 sets a bit in an NDP announcement control field (not shown) that indicates sounding of the AP. In an embodiment, the NDP announcement control field (not shown) is included in the sounding announcement field 1626. In another embodiment, the NDP announcement control field (not shown) is included in the MAC header 1602, such as in the control frame sub-type extension field 1616. The NDP announcement control field (not shown) includes other information such as SFB parameters, in an embodiment. In embodiments having the NDP announcement control field with a bit to indicate sounding with the AP, and similar to the above, when the client is to sound a single other client station, the MAC processing unit 28 sets the bit to a value indicating the AP is not being sounded, and sets the number of stations subfield 1630 to one and includes the AID of the other client station in the AID subfield 1632 to the AID of the client station to be sounded. In these embodiments, however, when the client is to sound the AP, the MAC processing unit 28 sets the bit in the NDP announcement control field discussed above to a value indicating that the AP is to be sounded. In these embodiments, the number of stations subfield 1630 is set to zero and the AID subfield 1632 is omitted.

In some embodiments, a non-AP communication device is permitted to perform sounding with more than one other communication device at a time. In these embodiments, the MAC processing unit 28 sets a portion of the control frame sub-type extension field 1616 to a value indicating the frame is an NDP announcement frame. In an embodiment, the MAC processing unit 28 sets a portion of the control frame sub-type extension field 1616 to indicate whether the other communication devices are to provide SFB in the TXOP of the client station (i.e. immediate feedback) or to indicate that the client station will poll the other communication device for SFB. Additionally, the MAC processing unit 28 sets the DA 1612 to a multicast or broadcast value and the SA 1614 to an address of the client station.

When the AP is one of the other communication devices to be sounded, the client station includes an AID value indicative of the AP in one of the AID subfields 1632. In another embodiment, the MAC processing unit 28 sets a bit in an NDP announcement control field (not shown) that indicates sounding of the AP. In an embodiment, the NDP announcement control field (not shown) is included in the sounding announcement field 1626. In another embodiment, the NDP announcement control field (not shown) is included in the MAC header 1602, such as in the control frame sub-type extension field 1616. In embodiments having the NDP announcement control field with a bit to indicate sounding with the AP, an AID value indicating the AP need not be included in the AID subfields 1632.

NDP announcement frames such as described above include information that indicates an estimated end of the sounding process, i.e., the end of the last SFB transmission. In some embodiments, this information permits communication devices not involved in the sounding process to go into a low power consumption mode until the end of the sounding process, when warranted and/or when configured to do so. Similarly, in some embodiments, this information permits communication devices involved in the sounding process and that have already transmitted their SFB to go into a low power consumption mode until the end of the sounding process, when warranted and/or when configured to do so.

If a client device is not yet ready to transmit SFB when the client device is expected to transmit SFB, the client device defers transmitting the SFB, in an embodiment and in some scenarios. For example, the client device transmits an ACK without SFB or does not respond at all. In another embodiment, if a client device is not yet ready to transmit SFB when the client device is expected to transmit SFB but has generated partial SET, the client device transmits the partial SFB with an indication that the SFB is partial, in an embodiment and in some scenarios. After the remainder of the SFB is ready, the client transmits the remaining SFB to the AP in the same TXOP of the AP or in a TXOP of the client device, in an embodiment. In another embodiment, if a client device cannot transmit all of the S FB within the TXOP because the remainder of the TXOP is not long enough, the client device transmits partial SFB with an indication that the SFB is partial, in an embodiment and in some scenarios. At a subsequent time, such as in response to a poll or in a TXOP owned by the client device, the client transmits the remaining SFB to the AP, in an embodiment.

In some scenarios, a communication device may not receive an NDP announcement or an NDP correctly. In some embodiments, a communication device transmits an SFB frame, when the device is expected to transmit SFB, where the SFB frame indicates that the communication device did not receive the NDP announcement or the NDP correctly.

In some scenarios, a communication device may determine that it need not transmit SFB. For example, the communication device may determine that channel conditions have already changed since generating the SFB and that the SFB is already out of date. As another example, the communication device may determine that the SFB is unchanged from previously transmitted SFB. As another example, a communication device may determine that it cannot or will not utilize beamforming with the device requesting SFB. In some embodiments, a communication device transmits an SFB frame, when the device is expected to transmit SFB, where the SFB frame indicates that the communication device will not transmit SFB. In an embodiment, the SFB frame that indicates the communication device will not transmit SFB also indicates why the communication device will not transmit SFB.

Figure 28:
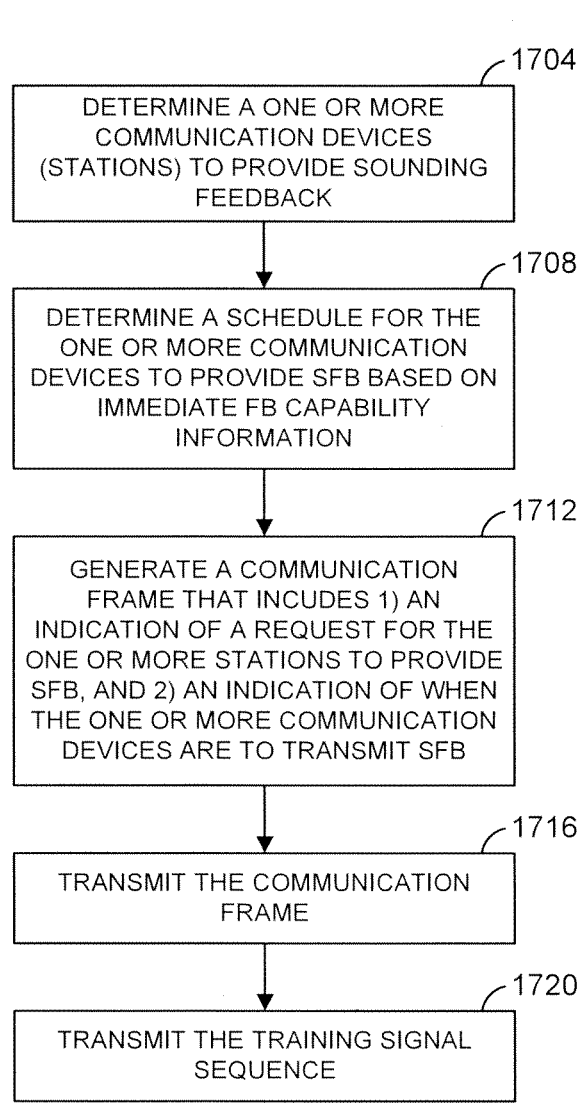
FIG. 28 is a flow diagram of another example method for generating and transmitting a communication frame related to requesting sounding feedback from one or more stations, in another embodiment.

FIG. 28 is a flow diagram of an example method 1700 for generating and transmitting a communication frame related to requesting sounding feedback from one or more stations, in an embodiment. The method 1700 is implemented by a network interface such as the network interface 16 of FIG. 1, in an embodiment. In other embodiments, the method 1700 is implemented by another suitable communication device.

At block 1704, one or more communication devices (stations) to provide sounding feedback (SFB) in response to a training signal (sounding) sequence (e.g., one or more NDPs) are determined. As discussed above, in various embodiments, the one or more stations comprises one or more of i) a single station, ii) a defined group of stations with an associated group ID, iii) a subset of stations in the defined group of stations, iv) a plurality of defined groups of stations with respective associated group IDs, v) a subset of stations in the defined groups of stations, vi) a plurality of individual stations, etc. In one embodiment, the MAC processing unit 18 implements block 1704.

At block 1708, a schedule for the one or more stations to provide SFB is determined based on immediate feedback capability information for the one or more stations. In an embodiment, the immediate feedback capability information includes information that indicates whether any of the one or more client stations is capable of transmitting SFB immediately after the end of a last NDP in a sounding sequence (e.g., spaced apart from the end of the last NDP by a defined time period such as a SIFS). As discussed above, in various embodiments, the AP selects a station capable of transmitting SFB immediately after the end of the last NDP to transmit the SFB of the station immediately after the end of the last NDP. If no stations are capable of transmitting SFB immediately after the end of the last NDP, the AP does not select any client to transmit the SFB of the station immediately after the end of the last NDP, in an embodiment. Additionally, in some embodiments, the AP schedules stations capable of transmitting SFB immediately after the end of the last NDP before stations not capable of transmitting SFB immediately after the end of the last NDP. In one embodiment, the AP schedules stations not capable of transmitting SFB immediately after the end of the last NDP to transmit SFB in response to a poll or SFB request subsequent to the sounding sequence. In one embodiment, the AP schedules all stations except one to transmit SFB in response to a poll or SFB request subsequent to the sounding sequence.

In some embodiments, determining the schedule includes determining that at least some stations are to be polled for SFB after the sounding sequence. In some embodiments, determining the schedule includes determining an order in which the at least some stations are to be polled for SFB. In some embodiments, determining the schedule includes determining that at least some stations should transmit SFB in the same TXOP in which the sounding sequence is transmitted. In some embodiments, determining the schedule includes determining an order in which the at least some stations are to transmit SFB in the same TXOP in which the sounding sequence is transmitted.

At block 1712, a communication frame is generated to include i) an indication of the one or more stations determined at block 1704, and ii) an indication of when the one or more stations are to transmit SFB. As discussed above, an AP may define a group of stations and assign the group of stations a group ID. Such a group ID can be specified in a group ID field of the communication frame. On the other hand, in some embodiments, the group ID field can be set to one or more values that do not correspond to a defined group. For example, a group ID field set to zero or another suitable value may indicate a single station is to be sounded or a plurality of individual stations not corresponding to a single group ID, not yet assigned to a group, etc., are to be sounded.

When only one station is to provide SFB, the group ID field is set to a value (e.g., zero or another suitable value) indicative of a single station, in an embodiment. The value need not be determinative that only a single station is to provide SFB. For example, the group ID value indicative of a single station may be indicative of other scenarios as well such as a plurality of individual stations, a broadcast, etc. Thus, in some embodiments, further information besides the group ID is needed to determine if only a single station is to provide SFB. For example, the group in combination with other information such as a number of stations field, a number of AID fields, a destination address, etc., may definitively indicate whether only one station is to be sounded.

When a plurality of stations in a defined group of stations is to provide SFB, a group ID field is set to the group ID corresponding to the plurality of stations, in an embodiment.

In one embodiment, the communication frame includes an indication of a station that is to transmit SFB immediately after the end of the last NDP. In one embodiment, the communication frame includes an indication of one or more stations that are to transmit SFB in a same TXOP in which the sounding sequence is transmitted. If more than one station is to transmit SFB in a same TXOP in which the sounding sequence is transmitted, the communication frame indicates an order in which the stations are to transmit SFB, in an embodiment. In another embodiment, if more than one station is to transmit SFB in a same TXOP in which the sounding sequence is transmitted, an order in which at least some of the stations are to transmit SFB is indicated separately from the communication frame, such as in a group definition frame.

In one embodiment, the communication frame includes an indication or indications of one or more stations that are to transmit SFB in response to a poll or SFB request subsequent to the sounding sequence.

In one embodiment, the MAC processing unit 18 and/or the PHY processing unit 20 implement blocks 1704, 1708, and 1712. For example, the MAC processing unit 18 populates fields in a MAC header and/or frame body, and/or causes the PHY processing unit 20 to populate fields in a PHY preamble.

At block 1716, the communication frame generated at block 1712 is transmitted. In one embodiment, the MAC processing unit 18 and the PHY processing unit 20 implement block 1716. For example, the MAC processing unit 18 causes the PHY processing unit 20 to transmit the communication frame.

At block 1720, the training signal sequence is transmitted. For example, in some embodiments, the training signal sequence is included in one or more NDPs transmitted after the communication frame generated at block 1712. As another example, in some embodiments, the training signal sequence is included in the communication frame generated at block 1712. In these embodiments, block 1720 is an element of block 1716. In one embodiment, the MAC processing unit 18 and the PHY processing unit 20 implement block 1720. For example, the MAC processing unit 18 causes the PHY processing unit 20 to transmit the training signal sequence.

In some embodiments and/or scenarios, one or more polling or SFB request frames are generated and transmitted to prompt one or more clients to transmit SFB. In these embodiments, the MAC processing unit 18 and/or the PHY processing unit 20 generate and transmit the one or more polling or SFB request frames.

In some embodiments, the method 1700 is implemented by a client device such as the client device 25-1 of FIG. 1. For instance, a client device requests SFB from one or more other client devices, the AP, or the AP and one or more client devices. In an embodiment, the method 1700 is implemented by the network interface 27 in a similar manner as discussed above with respect to the network interface 16.

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   determining a plurality of stations to provide sounding feedback in response to a training signal sequence;
   determining a schedule for the plurality of stations to provide sounding feedback based on capabilities of the plurality of stations to transmit sounding feedback at a defined time period after an end of the training signal sequence;
   generating a communication frame that includes i) an indication of a request for the plurality of stations to provide sounding feedback corresponding to the training signal sequence, ii) an indication of when the plurality of stations are to transmit sounding feedback, and (iii) an indication specifying the plurality of stations that are to provide sounding feedback, wherein the indication specifying the plurality of stations is included in a physical layer (PHY) preamble of the communication frame;
   causing the communication frame to be transmitted; and
   causing the training signal sequence to be transmitted.

2. A method according to claim 1, wherein the indication of when the plurality of stations are to transmit sounding feedback comprises a list of station identifiers in an order.

3. A method according to claim 2, wherein a first identifier in the list indicates a station that is to transmit sounding feedback at the defined time period after the end of the training signal sequence.

4. A method according to claim 2, wherein the communication frame includes an indicator of a number of identifiers in the list.

5. A method according to claim 1, wherein the indication specifying the plurality of stations comprises an indication of a station that is to transmit sounding feedback at the defined time period after the end of the training signal sequence.

6. A method according to claim 1, wherein the indication of when the plurality of stations are to transmit sounding feedback comprises an indication of whether the plurality of stations are to transmit sounding feedback in a same transmit opportunity period in which the training signal sequence is transmitted or in one or more subsequent transmit opportunity periods.

7. A method according to claim 1, wherein the indication of when the plurality of stations are to transmit sounding feedback comprises one or more indications of whether each of at least some of the plurality of stations are to transmit sounding feedback in a same transmit opportunity period in which the training signal sequence is transmitted or a subsequent transmit opportunity period.

8. A method according to claim 1, wherein the communication frame includes sounding feedback parameters.

9. A method according to claim 1, wherein the communication frame includes sounding feedback parameters for each of the plurality of stations.

10. A method according to claim 1, further comprising receiving sounding feedback from one of the stations in the plurality of stations in a transmit opportunity period in which the training signal sequence is transmitted and without transmitting a polling signal to prompt the one station to transmit the sounding feedback.

11. An apparatus, comprising:
    a network interface configured to
       determine a plurality of stations to provide sounding feedback in response to a training signal sequence;
       determine a schedule for the plurality of stations to provide sounding feedback based on capabilities of the plurality of stations to transmit sounding feedback at a defined time period after an end of the training signal sequence;
       generate a communication frame that includes i) an indication of a request for the plurality of stations to provide sounding feedback corresponding to the training signal sequence, ii) an indication of when the plurality of stations are to transmit sounding feedback, and (iii) an indication specifying the plurality of stations that are to provide sounding feedback, wherein the indication specifying the plurality of stations is included in a physical layer (PHY) preamble of the communication frame;
       cause the communication frame to be transmitted; and
       cause the training signal sequence to be transmitted.

12. An apparatus according to claim 11, wherein the indication of when the plurality stations are to transmit sounding feedback comprises a list of station identifiers in an order.

13. An apparatus according to claim 12, wherein a first identifier in the list indicates a station that is to transmit sounding feedback at the defined time period after the end of the training signal sequence.

14. An apparatus according to claim 12, wherein the communication frame includes an indicator of a number of identifiers in the list.

15. An apparatus according to claim 11, wherein the indication specifying the plurality of stations comprises an indication of a station that is to transmit sounding feedback at the defined time period after the end of the training signal sequence.

16. An apparatus according to claim 11, wherein the indication of when the plurality of stations are to transmit sounding feedback comprises an indication of whether the plurality of stations are to transmit sounding feedback in a same transmit opportunity period in which the training signal sequence is transmitted or in one or more subsequent transmit opportunity periods.

17. An apparatus according to claim 11, wherein the indication of when the plurality of stations are to transmit sounding feedback comprises one or more indications of whether each of at least some of the plurality of stations are to transmit sounding feedback in a same transmit opportunity period in which the training signal sequence is transmitted or a subsequent transmit opportunity period.

18. An apparatus according to claim 11, wherein the communication frame includes sounding feedback parameters.

19. An apparatus according to claim 11, wherein the communication frame includes sounding feedback parameters for each of the plurality of stations.

20. An apparatus according to claim 11, further comprising receiving sounding feedback from one of the stations in the plurality of stations in a transmit opportunity period in which the training signal sequence is transmitted and without transmitting a polling signal to prompt the one station to transmit the sounding feedback.

* * * * *